US009437110B2

(12) United States Patent
Otake

(10) Patent No.: US 9,437,110 B2
(45) Date of Patent: Sep. 6, 2016

(54) DRIVE ASSISTING APPARATUS

(75) Inventor: Hirotada Otake, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 136 days.

(21) Appl. No.: 13/261,862

(22) PCT Filed: Nov. 15, 2011

(86) PCT No.: PCT/JP2011/076333
§ 371 (c)(1), (2), (4) Date: May 14, 2014

(87) PCT Pub. No.: WO2013/073014
PCT Pub. Date: May 23, 2013

(65) Prior Publication Data
US 2014/0285331 A1 Sep. 25, 2014

(51) Int. Cl.
*B60W 10/04* (2006.01)
*B60W 10/10* (2012.01)
*B60W 10/18* (2012.01)
*G08G 1/16* (2006.01)
*G08G 1/0967* (2006.01)

(52) U.S. Cl.
CPC .......... *G08G 1/16* (2013.01); *G08G 1/096716* (2013.01); *G08G 1/096741* (2013.01); *G08G 1/096783* (2013.01); *G08G 1/166* (2013.01)

(58) Field of Classification Search
None
See application file for complete search history.

(56) References Cited

U.S. PATENT DOCUMENTS

2005/0209742 A1* 9/2005 Sakakibara ........... B60W 50/00 701/1
2010/0253493 A1* 10/2010 Szczerba ............... G01S 13/723 340/435

FOREIGN PATENT DOCUMENTS

| | | |
|---|---|---|
| JP | 2004 220332 | 8/2004 |
| JP | 2009 025902 | 2/2009 |
| JP | 2009-87062 A | 4/2009 |
| JP | 2009-265837 A | 11/2009 |
| JP | 2010 191625 | 9/2010 |
| JP | 2010 244308 | 10/2010 |
| JP | 2011 95828 | 5/2011 |
| JP | 2011 154619 | 8/2011 |

OTHER PUBLICATIONS

International Search Report Issued Feb. 28, 2012 in PCT/JP11/076333 Filed Nov. 15, 2012.

* cited by examiner

*Primary Examiner* — Edwin A Young
(74) *Attorney, Agent, or Firm* — Oblon, McClelland, Maier & Neustadt, L.L.P.

(57) ABSTRACT

A drive assisting apparatus includes an assistance controller configured to create a target vehicle travelling state in which a timing to start stop assistance is changed in accordance with an elapsed time elapsed from at the time a traffic light, which exists in an advancing direction of a vehicle, is switched to a stop display, and an assisting device configured to be able to output drive assisting information for assisting the driving of the vehicle based on the target travelling state amount of the vehicle.

20 Claims, 11 Drawing Sheets

DRIVE ASSISTING APPARATUS

FIELD

The present invention relates to a drive assisting apparatus.

BACKGROUND

A drive assisting apparatus that is mounted on a vehicle and that outputs information for assisting the driving of the vehicle by a driver is conventionally known. For such conventional drive assisting apparatus, patent literature 1 discloses a device that notifies the driver at which time point to start deceleration when the vehicle is to be stopped at a traffic light based on an arrival time to the traffic light and the time of change in the color of the traffic light, for example. Patent literature 1 also discloses a technique of urging the deceleration when the remaining time until the traffic light ahead changes from green to red is longer than the arrival time to the traffic light point. Patent literature 2 discloses a road side machine that predicts the stop position of an assisting target vehicle based on a number of preceding vehicles and signal light cycle information, and accelerates the stop assistance start timing based on the predicted stop position. Patent literature 3 discloses a device that provides attention calling information as a stop assistance at a timing to decelerate.

CITATION LIST

Patent Literature

Patent Literature 1: Japanese Patent Application Laid-open No. 2010-244308

Patent Literature 2: Japanese Patent Application Laid-open No. 2009-025902

Patent Literature 3: Japanese Patent Application Laid-open No. 2010-191625

SUMMARY

Technical Problem

However, the conventional drive assisting apparatus (patent literatures 1, 3, and the like) notify the deceleration start timing so that stop can be made at the traffic light point of the intersection, but actually, a preceding vehicle sometimes exist in front of the traffic light point. In this case, the position of actually stopping sometimes shifts from the traffic light point in the conventional drive assisting apparatus, and hence further improvement can be made in terms of more appropriate drive assistance, for example.

In light of the foregoing, it is a purpose of the present invention to provide a drive assisting apparatus that can appropriately assist driving.

Solution to Problem

In order to achieve the above mentioned object, a drive assisting apparatus according to the present invention is configured to assist driving of a vehicle. The drive assisting apparatus includes an assistance controller configured to determine a distance of stopping in a manner shifted with respect to a reference stop position of a traffic light, in accordance with an elapsed time elapsed from at the time the traffic light, which exists in an advancing direction of the vehicle, is switched to a stop display, and create a target travelling state amount in which a timing to start stop assistance is changed based on the distance; and an assisting device configured to be able to output drive assisting information for assisting the driving of the vehicle based on the target travelling state amount calculated by the assistance controller. Wherein, the target travelling state amount is a target brake operation start vehicle speed.

Further, in the drive assisting apparatus, it is preferable to configure that the assistance controller determines an estimated variation distance, which is a distance of stopping in a manner shifted with respect to a reference stop position of the traffic light, in accordance with the elapsed time, and changes the timing to start the stop assistance based on the estimated variation distance.

Further, in the drive assisting apparatus, it is preferable to configure that the assistance controller determines a target stop position based on a difference of an estimated variation distance, which is the distance of stopping in a manner shifted with respect to the reference stop position of the traffic light, and creates the target travelling state amount based on the target stop position to change the timing to start the stop assistance.

Further, in the drive assisting apparatus, it is preferable to configure that the assistance controller corrects a target vehicle speed at a time of start of brake braking with respect to the traffic light based on the estimated variation distance, and creates the target travelling state amount based on the corrected target vehicle speed at the time of the start of brake braking to change the timing to start the stop assistance.

Further, in the drive assisting apparatus, it is preferable to configure that the estimated variation distance is such that the distance becomes greater with increase in the elapsed time.

Further, in the drive assisting apparatus, it is preferable to configure that the assistance controller adjusts a value of the estimated variation distance with respect to the elapsed time, based on past stop position information indicating past stop position in which the vehicle stopped at the traffic light in the past.

Further, in the drive assisting apparatus, it is preferable to configure that the assistance controller determines a maximum value of the estimated variation distance with respect to the elapsed time based on the past stop position information.

Further, in the drive assisting apparatus, it is preferable to configure that the assistance controller determines an increasing rate of the estimated variation distance with respect to the elapsed time based on the past stopping information.

Further, in the drive assisting apparatus, it is preferable to configure that the assistance controller adjusts the value of the estimated variation distance based on a correlativity of the elapsed time and the past stop position information, and learns the correlativity for every traffic light or for every time slot.

Further, in the drive assisting apparatus, it is preferable to configure that the assistance controller determines an increasing rule of the estimated variation distance with respect to the elapsed time, based on change in the past stop position with respect to the elapsed time indicating the past stop position information accumulated for every elapsed time.

Further, in the drive assisting apparatus, it is preferable to configure that the past stop position information is information indicating a position of an average value of the past stop positions or the past stop position which is most distant from the traffic light.

Further, in the drive assisting apparatus, it is preferable to configure that the assistance controller determines a constant value, which is set in advance at the time a display mode of the traffic light is the stop display, as the estimated variation distance.

Further, in the drive assisting apparatus, it is preferable to configure that the assisting device performs assistance of urging recommended driving operation by outputting the drive assisting information.

Further, in the drive assisting apparatus, it is preferable to configure that the drive assisting information includes information instructing release of an acceleration request operation and a brake request operation.

Further, in the drive assisting apparatus, it is preferable to configure that the drive assisting information includes information instructing start of the brake request operation.

Advantageous Effects of Invention

The drive assisting apparatus according to the present invention has an effect of being able to appropriately assist driving.

DESCRIPTION OF EMBODIMENTS

Embodiments according to the present invention will be hereinafter described in detail based on the drawings. It should be recognized that the present invention is not to be limited by the embodiments. The configuring elements in the following embodiments include elements that can be easily replaced by those skilled in the art or elements that are substantially the same.

First Embodiment

Figure 1:
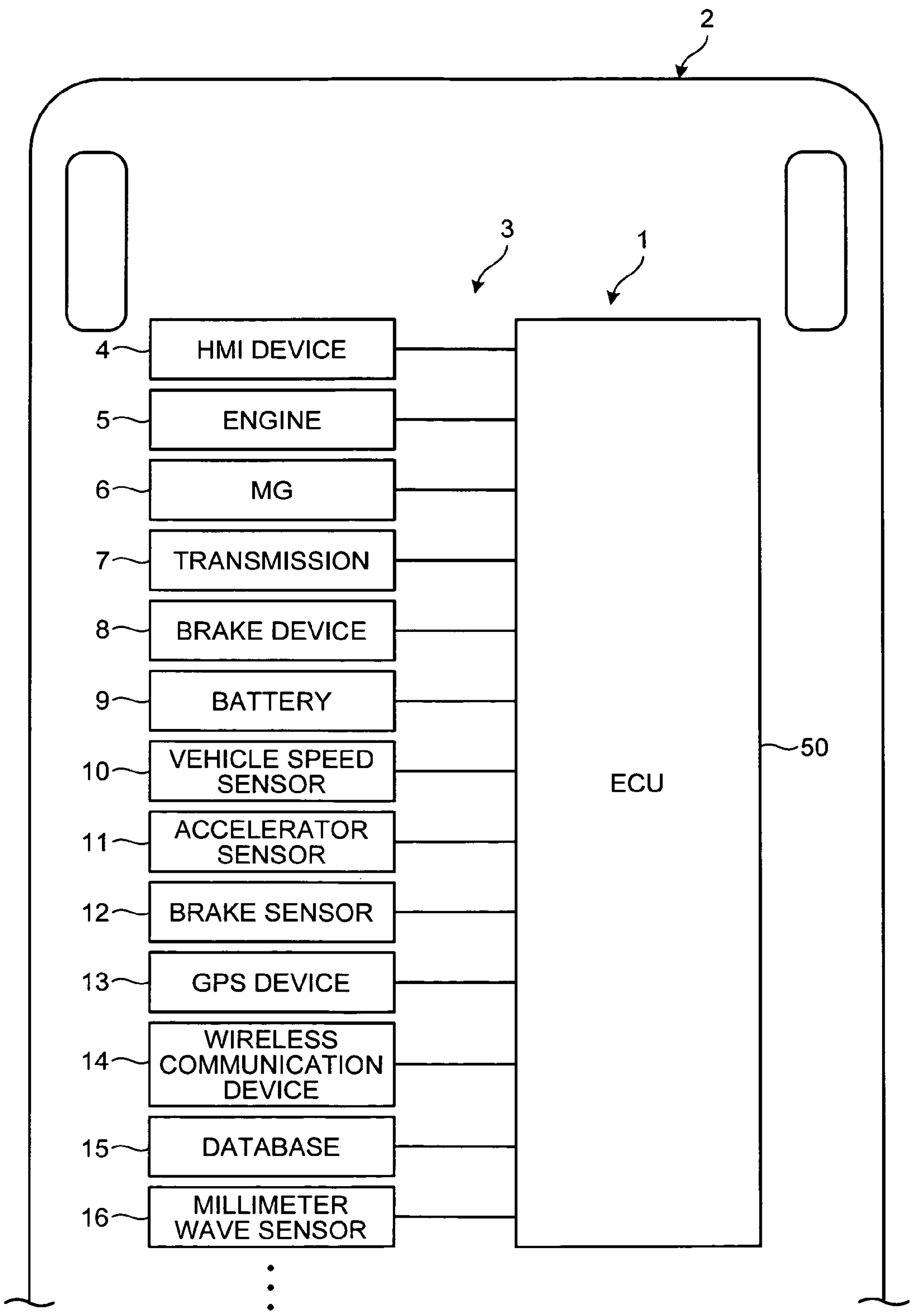
FIG. 1 is a schematic configuration view illustrating a vehicle control system.
Figure 2:
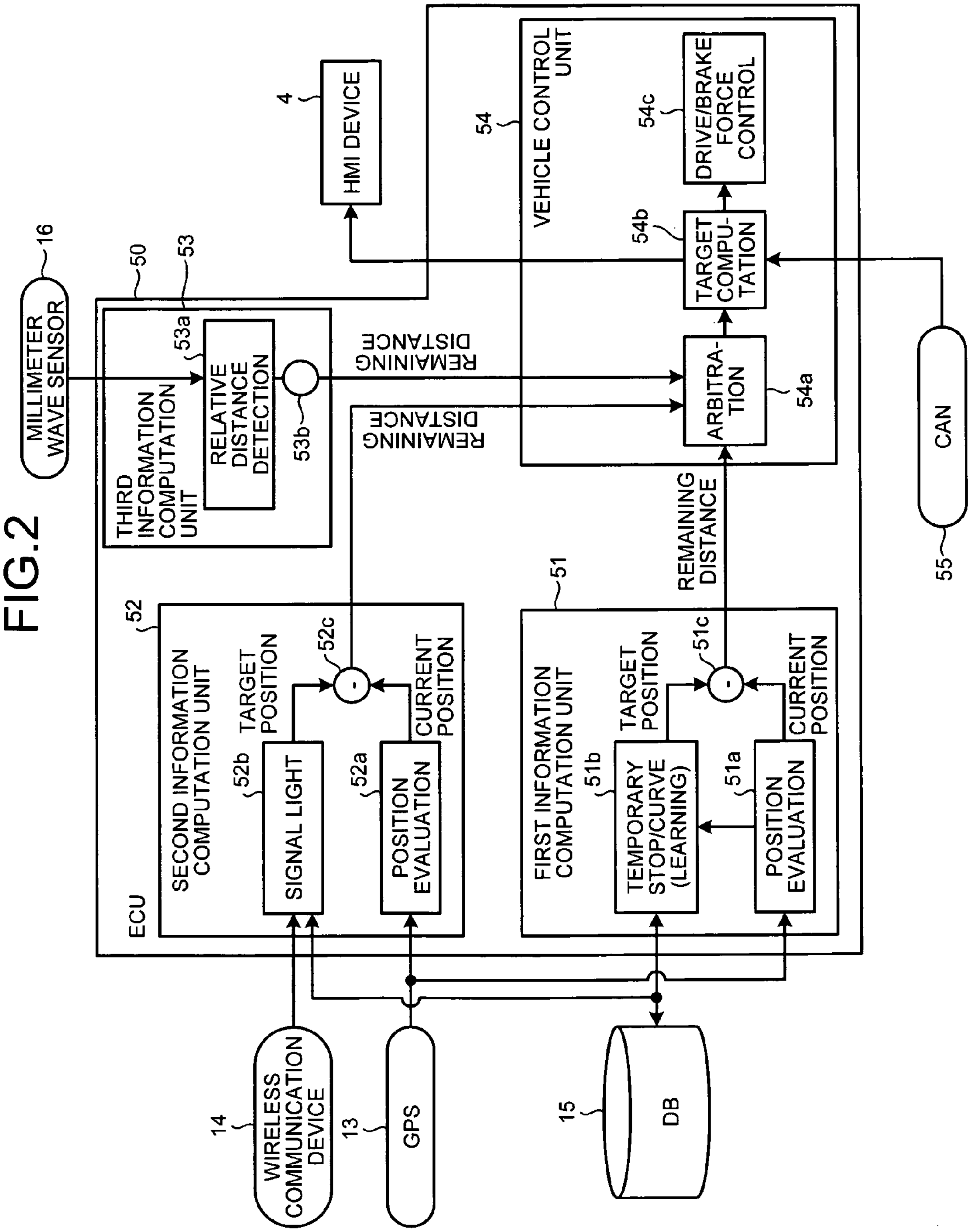
FIG. 2 is a block diagram illustrating one example of a schematic configuration of an ECU.
Figure 3:
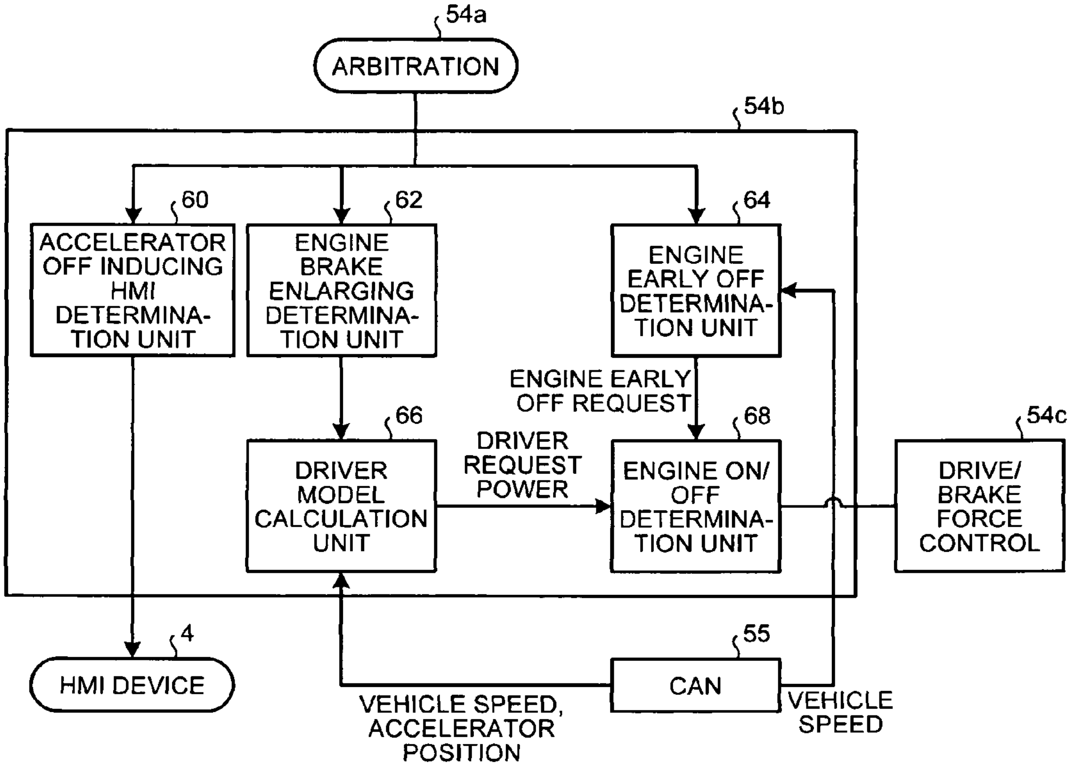
FIG. 3 is a block diagram illustrating one example of a schematic configuration of a target computation portion.

FIG. 1 is a schematic configuration view illustrating a vehicle control system according to a first embodiment, FIG. 2 is a block diagram illustrating one example of a schematic configuration of an ECU according to the first embodiment, and FIG. 3 is a block diagram illustrating one example of a schematic configuration of a target computation portion.

As illustrated in FIG. 1, a drive assisting apparatus 1 of the present embodiment is applied to a vehicle control system 3 mounted on a vehicle 2. The drive assisting apparatus 1 includes a Human Machine Interface (HMI) device (hereinafter sometimes referred to as "HMI") 4 serving as an assisting device, and an Electronic Control Unit (ECU) 50. The drive assisting apparatus 1 assists the driving of the vehicle 2 by the driver by having the ECU 50 control the HMI device 4 according to the situation and output various drive assisting information.

The vehicle control system 3 applied with the drive assisting apparatus 1 of the present embodiment is a so-called read-ahead information eco-drive assisting system that utilizes the read-ahead information. In other words, the vehicle control system 3 utilizes the read-ahead information so that the drive assisting apparatus 1 performs the assistance of urging driving of high fuel efficiency enhancing effect to the driver to assist eco-driving (eco-drive) by the driver. Thus, the vehicle control system 3 is a system configured to enhance the fuel efficiency by suppressing the consumption of fuel. Typically, the drive assisting apparatus 1 outputs the drive assisting information and inductively assists the operation by the driver for the purpose of assisting the eco-driving by the driver.

The vehicle control system 3 of the present embodiment is also a so-called hybrid system that combines an engine 5 and an MG 6 to obtain a travelling drive source for rotationally driving the drive wheels of the vehicle 2. In other words, the vehicle 2 is a hybrid vehicle including the MG 6 as a travelling drive source in addition to the engine 5. The vehicle 2 is configured to enhance the fuel efficiency by running the engine 5 at as satisfactory as possible efficiency state, and compensating the excess and deficiency of power and engine brake force with the MG 6, which is a rotating electrical machine, and furthermore regenerating the energy at the time of deceleration.

In the following description, the vehicle control system 3 is described as a hybrid system including the engine 5 and the MG 6 as the travelling drive source, but is not limited thereto. The vehicle control system 3 may be a system that includes the engine 5 as the travelling drive source but does not include the MG 6, or may be a system that includes the MG 6 as the travelling drive source but does not include the engine 5. In other words, the vehicle 2 may be a so-called conveyor vehicle or may be an EV vehicle (electric automobile).

Specifically, the vehicle control system 3 is configured to include the HMI device 4, the engine 5 serving as an internal combustion, a motor generator (hereinafter sometimes referred to as "MG") 6 serving as an electric motor, a transmission 7, a brake device 8, a battery 9, and the like. The vehicle control system 3 includes a vehicle speed sensor 10, an accelerator sensor 11, a brake sensor 12, a Global Positioning System (GPS) device (hereinafter sometimes referred to as "GPS") 13, a wireless communication device 14, a database (hereinafter sometimes referred to as "DB") 15, a millimeter wave sensor 16, and the like.

The HMI device 4 is an assisting device capable of outputting the drive assisting information, which is information for assisting the driving of the vehicle 2, and is a device that provides the drive assisting information to the driver, and the like. The HMI device 4 is an in-vehicle device, and for example, includes a display device (visual information display device), a speaker (sound output device), and the like arranged in a vehicle compartment of the vehicle 2. The HMI device 4 may be an existing device, for example, a display device, a speaker, and the like of a navigation system. The HMI device 4 provides information by audio information, visual information (figure information, character information), and the like, and induces the driving operation by the driver to enhance the fuel efficiency. The HMI device 4 assists the realization of the target value by the driving operation by the driver by such information provision. The HMI device 4 is, for example, electrically connected to the ECU 50 and controlled by the ECU 50. The HMI device 4 may be configured to include, for example, a touch information output device that outputs touch information such as steering wheel vibration, seat vibration, pedal reactive force.

The vehicle control system 3 is mounted with the engine 5, the MG 6, the transmission 7, the brake device 8, the battery 9, and the like as various actuators for realizing the travelling of the vehicle 2.

The engine 5 acts the drive force on the wheels of the vehicle 2 in accordance with an acceleration request operation by the driver, for example the depressing operation of the acceleration pedal. The engine 5 consumes fuel and generates an engine torque serving as an engine torque as a power for travelling to be acted on the drive wheels of the vehicle 2. In other words, the engine 5 is a heat engine that outputs heat energy generated by combusting fuel in a form of a mechanical energy such as torque, and examples thereof include a gasoline engine, a diesel engine, an LPG engine, and the like. The engine 5 includes, for example, a fuel injection device, an ignition device, a throttle valve device, and the like (not illustrated), which devices are electrically connected to the ECU 50 and controlled by the ECU 50. The engine 5 has the output torque controlled by the ECU 50. The power generated by the engine 5 may be used for the power generation in the MG 6.

The MG 6 acts the drive force on the wheels of the vehicle 2 in accordance with the acceleration request operation by the driver, for example, the depressing operation of the acceleration pedal. The MG 6 converts the electric energy to the mechanical power and generates the motor torque as the power for travelling to be acted on the drive wheels of the vehicle 2. The MG 6 is a so-called rotating electrical machine including a stator, which is a fixing element, and a rotor, which is a rotating element. The MG 6 is an electric motor that converts the electric energy to the mechanical power and outputs the same, and is also a power generator that converts the mechanical power to the electric energy and collects the same. In other words, the MG 6 has both a function (power running function) serving as the electric motor that is driven by the supply of power and that converts the electric energy to the mechanical energy, and a function (regenerating function) serving as the power generator that converts the mechanical energy to the electric energy. The MG 6 is electrically connected to the ECU 50 through an inverter, and the like for performing the conversion of the DC current and the AC current, and is controlled by the ECU 50. The MG 6 has the output torque and the power generation amount controlled by the ECU 50 through the inverter.

The transmission 7 is a power transmitting device that speed-changes the rotation output by the engine 5 and the MG 6, and transmits the same toward the drive wheel side of the vehicle 2. The transmission 7 may be a so-called a manual transmission (MT), or may be a so-called automatic transmission such as a stepped automatic transmission (AT), a continuously variable transmission (CVT), a multi-mode manual transmission (MMT), a sequential manual transmission (SMT), a dual clutch transmission (DCT). The transmission 7 will be described here as a continuously variable transmission that uses a planetary gear train, and the like, for example. The transmission 7 has a transmission actuator, and the like electrically connected to the ECU 50, and controlled by the ECU 50.

The brake device 8 acts a braking force on the wheels of the vehicle 2 in accordance with a brake request operation by the driver, for example, the depressing operation of the brake pedal. For example, the brake device 8 generates a predetermined friction force (friction resistance force) between the friction elements such as the brake pad, the brake disc to exert the braking force on the wheels rotatably supported by a vehicle body of the vehicle 2. The brake device 8 thereby generates the braking force at a ground surface of the wheel of the vehicle 2 with the road surface to put the brake on the vehicle 2. The brake device 8 has the brake actuator, and the like electrically connected to the ECU 50, and controlled by the ECU 50.

The battery 9 is an electrical storage device capable of storing power (electrical storage) and discharging the stored power. The battery 9 is electrically connected to the ECU 50, and outputs signals associated with various information to the ECU 50.

When functioning as the electric motor, the MG 6 is supplied with the power stored in the battery 9 through the inverter, and converts the supplied power to the power for travelling of the vehicle 2 and outputs the same. When functioning as the power generator, the MG 6 is driven by the input power to generate power, and charges the generated power to the battery 9 through the inverter. In this case, the MG 6 can put a brake (regenerative braking) on the rotation of the rotor by the rotation resistance generated by the rotor. As a result, the MG 6 can cause the rotor to generate the motor regenerating torque, which is the negative motor torque, by the regeneration of the power, and can consequently exert the braking force on the drive wheels of the vehicle 2 at the time of regenerative braking. That is, the vehicle control system 3 can collect the motion energy of the vehicle 2 as the electric energy when the mechanical power is input from the drive wheel of the vehicle 2 to the MG 6 so that the MG 6 generates power by regeneration. The vehicle control system 3 can perform the regenerative braking by the MG 6 by transmitting the mechanical power (negative motor torque) generated by the rotor of the MG 6 accompanied therewith to the drive wheel. In this case, in the vehicle control system 3, when the regeneration amount (power generation amount) by the MG 6 is made relatively small, the braking force that generates becomes relatively small and the deceleration that acts on the vehicle 2 becomes relatively small. In the vehicle control system 3, when the regeneration amount (power generation amount) by the MG 6 is made relatively large, the braking force that generates becomes relatively large and the deceleration that acts on the vehicle 2 becomes relatively large.

The vehicle speed sensor 10, the accelerator sensor 11, and the brake sensor 12 are state detection devices that detect the travelling state of the vehicle 2 and the input (driver input) with respect to the vehicle 2 by the driver, that is, the state amount and the physical amount associated with the actual operation with respect to the vehicle 2 by the driver. The vehicle speed sensor 10 detects the vehicle speed (hereinafter sometimes referred to as "vehicle speed") of the vehicle 2. The accelerator sensor 11 detects the accelerator position, which is the operation amount (depression amount) of the acceleration pedal by the driver. The brake sensor 12 detects the operation amount (depression amount), for example, the master cylinder pressure, and the like of the brake pedal by the driver. The vehicle speed sensor 10, the accelerator sensor 11, and the brake sensor 12 are electrically connected to the ECU 50, and output the detection signals to the ECU 50.

The GPS device 13 is a device that detects the current position of the vehicle 2. The GPS device 13 receives the GPS signal output by a GPS satellite, and position measures/computes the GPS information (X coordinate; X, Y coordinate; Y), which is the position information of the vehicle 2, based on the received GPS signal. The GPS device 13 is electrically connected to the ECU 50, and outputs the signal associated with the GPS information to the ECU 50.

The wireless communication device 14 is a read-ahead information acquiring device that acquires the read-ahead information associated with the travelling of the vehicle 2 using wireless communication. The wireless communication device 14 acquires the read-ahead information using the wireless communication from a device, and the like that exchanges information using communication infrastructure such as Internet through, for example, a road-vehicle communication machine (road side machine) such as an optical beacon installed on the road side, a vehicle-vehicle communication machine vehicle installed on another vehicle, a Vehicle Information and Communication System (VICS (registered trademark)) center, and the like. The wireless communication device 14 acquires, for example, preceding vehicle information, following vehicle information, signal light information, construction/traffic regulation information, traffic jam information, emergency vehicle information, information associated with an accident history database, and the like for the read-ahead information. For example, the signal light information includes the position information of the traffic light ahead in the travelling direction of the vehicle 2, the signal light cycle information such as a lighting cycle and a signal change timing of green light, yellow light, and red light, a lighting continuing time of the red light or the green light. The wireless communication device 14 is electrically connected to the ECU 50, and outputs the signal associated with the read-ahead information to the ECU 50.

The database 15 stores various information. The database 15 stores map information including road information, various information and learning information obtained by the actual travelling of the vehicle 2, read-ahead information acquired by the wireless communication device 14, and the like. For example, the road information includes road gradient information, road surface state information, road shape information, limiting vehicle speed information, road curvature (curve) information, temporary stop information, stop line position information, and the like. The information stored in the database 15 is appropriately referenced by the ECU 50, and the necessary information is read out. The database 15 is illustrated to be vehicle installed on the vehicle 2, but is not limited thereto, and may be arranged in an information center, and the like exterior to the vehicle 2, and the necessary information may be read out by appropriately being referenced by the ECU 50 through the wireless communication, and the like. The database 15 of the present embodiment accumulates the information of the position (actual stop position) where the vehicle 2 stopped at the traffic light, the intersection, and the like where the reference stop position such as the stop line are arranged as the learning information. The database 15 accumulates the information of the actual stop position for every reference stop position.

The millimeter wave sensor 16 is a sensor for measuring the inter-vehicle distance of the own vehicle and the preceding vehicle (vehicle in front of the vehicle 2). The millimeter wave sensor 16 emits the electric wave of the millimeter waveband toward the front side of the vehicle 2, and receives the electric wave reflected from the object (preceding vehicle, front vehicle) and returned to the own machine of the emitted electric wave. The millimeter wave sensor 16 compares the output condition of the emitted electric wave and the detection result of the received electric wave to calculate the distance with the front vehicle. The millimeter wave sensor 16 may detect the distance with the obstruction on the front side of the own vehicle. The millimeter wave sensor 16 transmits the information of the calculated distance with the front vehicle to the ECU 50. In the present embodiment, the millimeter wave sensor 16 is used as a sensor for measuring the inter-vehicle distance of the own vehicle and the preceding vehicle (vehicle in front of the vehicle 2), but various types of sensors that can measure the distance with an object in front of the vehicle 2 may be used. For example, the vehicle 2 may be a laser radar sensor instead of the millimeter wave sensor 16.

The ECU 50 is a control unit that comprehensively performs the control of the entire vehicle control system 3, and is, for example, configured as an electronic circuit having a well-known microcomputer including a CPU, a ROM, a RAM, and an interface as the main body. The ECU 50 is input with electric signals corresponding to the detection results detected by the vehicle speed sensor 10, the accelerator sensor 11, the brake sensor 12, and the millimeter wave sensor 16, the GPS information acquired by the GPS device 13, the read-ahead information acquired by the wireless communication device 14, various information stored in the database 15, the drive signal of each unit, the control command, and the like. The ECU 50 controls the HMI device 4, the engine 5, the MG 6, the transmission 7, the brake device 8, the battery 9, and the like according to such input electric signals, and the like. The ECU 50, for example, executes the drive control of the engine 5, the drive control of the MG 6, the speed-change control of the transmission 7, the brake control of the brake device 8, and the like based on the accelerator position, the vehicle speed, and the like. The ECU 50 can also realize various vehicle travelling (travelling mode) in the vehicle 2 by simultaneously or selectively using the engine 5 and the MG 6 according to the driving state.

The ECU 50 can detect the ON/OFF of the accelerator operation, which is the acceleration request operation, with respect to the vehicle 2 by the driver based on the detection result of the accelerator sensor 11, for example. Similarly, the ECU 50 can detect the ON/OFF of the brake operation, which is the brake request operation, with respect to the vehicle 2 by the driver based on the detection result of the brake sensor 12, for example. A state in which the accelerator operation by the driver is turned OFF is a state in which the driver released the acceleration request operation on the vehicle 2, whereas a state in which the accelerator operation by the driver is turned ON is a state in which the driver is performing the acceleration request operation on the vehicle 2. Similarly, a state in which the brake operation by the driver is turned OFF is a state in which the driver released the brake request operation on the vehicle 2, whereas a state in which the brake operation by the driver is turned ON is a state in which the driver is performing the brake request operation on the vehicle 2.

The drive assisting apparatus 1 is configured to include the HMI device 4 and the ECU 50. The drive assisting apparatus 1 may include various types of sensors for detecting the vehicle state and various information acquiring units for providing the peripheral information in addition to the HMI device 4 and the ECU 50. The drive assisting apparatus 1 performs an assistance of urging the driving of high fuel efficiency enhancing effect on the driver by having the ECU 50 control the HMI device 4 according to the situation and output various drive assisting information. The drive assisting apparatus 1 performs the inducing assistance of urging the recommended driving operation, typically, the driving operation involving change on the driver by having the HMI device 4 output various drive assisting information according to the control by the ECU 50 based on the target travelling state amount of the travelling vehicle 2. The target travelling state amount is, typically, the target travelling state amount of the vehicle 2 at a predetermined point or timing in the travelling vehicle 2. The drive assisting apparatus 1 has the ECU 50 control the HMI device 4 based on the target travelling state amount at a predetermined point or timing, and having the HMI device 4 output the drive assisting information and performing the assistance of urging the recommended driving operation on the driver to perform the drive assistance such that the travelling state amount of the vehicle 2 becomes the target travelling state amount at a predetermined point or timing.

The drive assisting apparatus 1 of the present embodiment changes (moves) the target stop position from the reference stop position (position of stop line) based on various conditions when stopping the vehicle 2 at the stop position such as the traffic light, the intersection. Specifically, the drive assisting apparatus 1 calculates an estimated variation distance (also referred to as variation distance) Y, and assumes the position moved toward the near side (current position side of the vehicle 2) by the estimated variation distance calculated from the reference stop position as the target stop position.

The drive assisting apparatus 1 determines the target travelling state amount, which is a predetermined travelling state at a predetermined position, based on the changed target stop position. The drive assisting apparatus 1 outputs the drive assisting information based on the target travelling state. The drive assisting apparatus 1 of the present embodiment outputs the drive assisting information to the HMI device 4 in visual information. By way of example, the target travelling state amount includes a target brake operation start vehicle speed, which is a recommended vehicle speed in which the brake operation (brake request operation) by the driver is recommended. The recommended driving operation the drive assisting apparatus 1 inductively assists with respect to the driver is the OFF operation (release operation of the acceleration request operation) of the accelerator operation by the driver by way of example. The drive assisting apparatus 1 superimposition displays on a center meter configuring the HMI device 4, a head-up display (HUD), and a front glass, and image displays the visual information as the drive assisting information on the visual information display device such as the liquid crystal display, by way of example.

The vehicle 2 outputs information instructing to perform the OFF operation of the accelerator operation as the drive assisting information, and causes the driver to execute the OFF operation of the accelerator operation at a predetermined position so that the vehicle speed approximately becomes the target brake operation start vehicle speed at the predetermined point. The vehicle 2 can smoothly stop in the vicinity of the target stop position by having the driver start the brake operation at a predetermined position where the target brake operation start vehicle speed is obtained as the vehicle speed approximately becomes the target brake operation start vehicle speed at the predetermined point. Thus, the drive assisting information is output so that the vehicle 2 appropriately stops at the target stop position corresponding to various conditions. The drive assisting apparatus 1 thereby realizes the appropriate drive assistance suppressing the sense of uncomfortableness on the driver in the drive assistance.

One example of a schematic configuration of the ECU 50 will now be described with reference to the block diagram of FIG. 2. As illustrated in FIG. 2, the ECU 50 is configured to include a first information computation unit 51, a second information computation unit 52, a third information computation unit 53, and a vehicle control unit 54. The first information computation unit 51, the second information computation unit 52, and the third information computation unit 53 are Intelligent Transport Systems (ITS) corresponding computation units, for example, and are computation units for performing infrastructure cooperation and NAVI cooperation. The vehicle control unit 54 is a control unit that controls each unit of the vehicle 2. The vehicle control unit 54 is connected to an actuator ECU and sensor series that control various types of actuators such as the engine control ECU, the MG control ECU, the transmission control ECU, the brake control ECU, the battery control ECU through a Control Area Network (CAN) 55 built as an in-vehicle network. The vehicle control unit 54 acquires the control values of the various types of actuators and the detection values of the sensors through the CAN 55 as the vehicle information. The ECU 50 is not limited thereto, and for example, may be configured to include the NAVI device in place of the first information computation unit 51.

The first information computation unit 51 computes the remaining distance from the vehicle 2 to the temporary stop, curve, and the like ahead in the travelling direction based on static infrastructure information, and for example, the map information including road information, and the like. The first information computation unit 51 learns the usual driving behavior of the driver, performs the driving behavior estimation based thereon, and also performs learning/prediction of the deceleration stop behavior of the driver. The first information computation unit 51 then computes the remaining distance from the vehicle 2 to the deceleration stop position ahead in the travelling direction. The deceleration stop position obtained by learning the usual driving behavior of the driver is, for example, a position where the frequency the driver decelerates and stops is high, other than at the temporary stop and the like.

The first information computation unit 51 may perform the learning of the deceleration stop behavior of the driver, that is, the learning of the deceleration stop position corresponding to the driver based on various information obtained in the actual travelling of the vehicle 2. For example, the first information computation unit 51 learns the habit and the tendency of the driving operation from the usual driving by the driver in association with a human (e.g., attribute of the driver), place (e.g., operated position or the like), situation (e.g., time slot or the like), and the like based on the various information obtained in the actual travelling of the vehicle 2. The first information computation unit 51, for example, learns the temporary stop and the deceleration stop position where the frequency the driver decelerates and stops is high by statistically processing the ON/OFF, and the like of the accelerator operation and the brake operation by the driver. The first information computation unit 51 stores the learned information in the database 15 as the learning information.

The first information computation unit 51 function conceptually includes a position evaluating portion 51*a*, a temporary stop/curve information acquiring portion (hereinafter sometimes referred to as "temporary stop/curve information acquiring portion") 51*b*, and a subtractor 51*c*. The position evaluating portion 51*a* acquires the GPS information through the GPS device 13, and acquires the current position information of the vehicle (own vehicle) 2. The position evaluating portion 51*a* outputs the current position information to the temporary stop/curve information acquiring portion 51*b* and the subtractor 51*c*. The temporary stop/curve information acquiring portion 51*b* references the map information stored in the database 15, and the various information and the learning information obtained in the actual travelling of the vehicle 2 based on the current position information input from the position evaluating portion 51*a* to acquire the target position information indicating temporary stop, curve, or deceleration stop position ahead in the travelling direction of the vehicle 2. The temporary stop/curve information acquiring portion 51*b* outputs the target position information to the subtractor 51*c*. The subtractor 51*c* computes the difference of the position of the vehicle 2 indicated by the current position information input from the position evaluating portion 51*a* and the temporary stop, curve or deceleration stop position indicated by the target position information input from the temporary stop/curve information acquiring portion 51*b*, and computes the remaining distance to the temporary stop, curve, or deceleration stop position. The subtractor 51*c* outputs the remaining distance information indicating the remaining distance to an arbitration portion 54*a* of the vehicle control unit 54.

The first information computation unit 51 determines whether the estimated variation distance Y is set to the target temporary stop and the deceleration stop position in the temporary stop/curve information acquiring portion 51*b*. When determined that the estimated variation distance Y is set to the target temporary stop and the deceleration stop position in the temporary stop/curve information acquiring portion 51*b*, the first information computation unit 51 moves the target position information indicating the target stop position toward the near side than the reference stop position (position of stop line of the target temporary stop and deceleration stop position) based on the value of the estimated variation distance Y. The first information computation unit 51 computes the remaining distance with the changed target stop position as a reference. The information of the estimated variation distance Y can be stored in the database 15. The method for setting the estimated variation distance Y will be described later.

The second information computation unit 52 computes the remaining distance from the vehicle 2 to the stop position by the red light ahead in the travelling direction based on the dynamic infrastructure information, for example, the signal light information, and the like.

The second information computation unit 52 function conceptually includes a position evaluating portion 52*a*, a signal light information acquiring portion 52*b*, and a subtractor 52*c*. The position evaluating portion 52*a* acquires the GPS information through the GPS device 13, and acquires the current position information of the vehicle (own vehicle) 2. The position evaluating portion 52*a* outputs the current position information to the subtractor 52*c*. The signal light information acquiring portion 52*b* acquires the signal light information through the wireless communication device 14, and acquires the target position information indicating the stop position by the red light ahead in the travelling direction of the vehicle 2 based on the signal light information. The signal light information acquiring portion 52*b* outputs the target position information to the subtractor 52*c*. The subtractor 52*c* computes the difference of the position of the vehicle 2 indicated by the current position information input from the position evaluating portion 52*a* and the stop position by the red light indicated by the target position information input from the signal light information acquiring portion 52*b*, and computes the remaining distance to the stop position by the red light. The subtractor 52*c* outputs the remaining distance information indicating the remaining distance to the arbitration portion 54*a* of the vehicle control unit 54.

The second information computation unit 52 determines whether the estimated variation distance Y is set to the stop position (position of the stop line corresponding to the traffic light) by the target red light in the signal light information acquiring portion 52*b*. When determined that the estimated variation distance Y is set to the stop position by the target red light in the signal light information acquiring portion 52*b*, the second information computation unit 52 moves the target position information indicating the target stop position toward the near side than the reference stop position (position of the stop line corresponding to the traffic light) based on the value of the estimated variation distance Y. The second information computation unit 52 computes the remaining distance with the changed target stop position as a reference. The information of the estimated variation distance Y can be stored in the database 15. The method for setting the estimated variation distance Y will be described later.

The third information computation unit 53 function conceptually includes a relative distance detecting portion 53*a*, and a conversion portion 53*b*. The relative distance detecting portion 53*a* acquires the detection result of the millimeter wave sensor 16. The relative distance detecting portion 53*a* detects the presence or absence of the preceding vehicle from the detection result of the millimeter wave sensor 16, and detects the relative distance with the preceding vehicle when the preceding vehicle is present. The conversion portion 53*b* creates information for adjusting the remaining distance from the information of the relative distance with the preceding vehicle calculated by the relative distance detecting portion 53*a*. Specifically, when the relative distance with the preceding vehicle is shorter than the set distance, the conversion portion 53*b* creates the adjustment information of the remaining distance including an instruction to further shorten the remaining distance. When the relative distance with the preceding vehicle is greater than or equal to the set distance, the conversion portion 53*b* creates the adjustment information of the remaining distance including an instruction to have the remaining distance as it is. That is, the conversion portion 53*b* creates the adjustment information of the remaining distance for instructing to have the remaining distance as is or to have the remaining distance shorter based on the relative distance with the preceding vehicle. The conversion portion 53*b* may output the relative distance with the preceding vehicle as is to the vehicle control unit 54.

The vehicle control unit 54 comprehensively controls the drive/brake force of the HMI device 4 and the vehicle 2 based on the remaining distance to the temporary stop, curve or deceleration stop position computed by the first information computation unit 51, the remaining distance to the stop position by the red light computed by the second information computation unit 52, the information based on the relationship of the preceding vehicle computed by the third information computation unit 53, the vehicle speed Vx of the vehicle 2, the ON/OFF of the accelerator operation, the ON/OFF of the brake operation, the accelerator position, and the like.

The vehicle control unit 54 function conceptually includes the arbitration portion 54*a*, a target computation portion 54*b*, and a drive/brake force control portion 54*c*. The arbitration portion 54*a* arbitrates the remaining distance information to the temporary stop, curve, or deceleration stop position input from the subtractor 51*c*, the remaining distance information to the stop position by the red light input from the subtractor 52*c*, and the adjustment information of the remaining distance based on the relationship with the preceding vehicle input from the conversion portion 53*b*. The arbitration portion 54*a* arbitrates the remaining distance information based on the accuracy of the remaining distance information, the magnitude relationship of the remaining distance, and the like, for example, and outputs the arbitration result to the target computation portion 54*b*. When performing the stop assistance, the arbitration portion 54*a* arbitrates the remaining distance information basically input from the subtractor 51*c* and the remaining distance information input from the subtractor 52*c*, and determines the target to perform the stop assistance. That is, the arbitration portion 54*a* determines whether to stop at the stop position of temporary stop such as the intersection, and the like where there is no traffic light or to stop at the stop position of the traffic light when the traffic light is red, and determines the remaining distance. Furthermore, the arbitration portion 54*a* adjusts the determined remaining distance based on the adjustment information of the remaining distance based on the relationship with the preceding vehicle input from the conversion portion 53*b* to create the remaining distance information to output to the target computation portion 54*b*.

The target computation portion 54*b* computes the target traveling state amount based on the arbitration result of the remaining distance information input from the arbitration portion 54*a*, the vehicle speed Vx of the vehicle 2 input from the vehicle speed sensor 10 through the CAN 55, and the like. The target computation portion 54*b* controls the HMI device 4 and the drive/brake force control portion 54*c* based on the target travelling state amount.

One example of a schematic configuration of the target computation portion 54*b* will now be described with reference to the block diagram of FIG. 3. As illustrated in FIG. 3, the target computation portion 54*b* includes an accelerator OFF inducing HMI determination unit 60, an engine brake enlarging determination unit 62, an engine early OFF determination unit 64, a driver model calculation unit 66, and an engine ON/OFF determination unit 68. The accelerator OFF inducing HMI determination unit 60 computes the timing to inductively assist the OFF operation of the accelerator operation by the HMI device 4 based on the target travelling state amount, controls the HMI device 4 in accordance therewith, and outputs the drive assisting information.

The engine brake enlarging determination unit 62 calculates the magnitude of the engine brake to generate based on the target travelling state amount. That is, the engine brake enlarging determination unit 62 calculates the magnitude of the engine brake necessary for decelerating to the speed of turning ON the brake operation at a predetermined point after the OFF operation of the accelerator operation is generated based on the target travelling state amount. The engine brake enlarging determination unit 62 calculates the number of times and the time zone to perform the engine brake regeneration by the MG 6 in addition to the normal engine brake, and the like based on the calculated magnitude of the engine brake. The engine brake enlarging determination unit 62 transmits the calculation result to the driver model calculation unit 66.

The engine early OFF determination unit 64 calculates the timing to turn OFF the output of the engine 5 based on the target travelling state amount. That is, the engine early OFF determination unit 64 determines whether the output of the engine 5 can be turned OFF, that is, a state of generating the engine brake can be obtained to decelerate to the speed of turning ON the brake operation at a predetermined point after the OFF operation of the accelerator operation is generated based on the target travelling state amount. When determined that the engine 5 needs to be turned OFF, the engine early OFF determination unit 64 outputs an engine early OFF request to the engine ON/OFF determination unit 68 when the calculated timing is reached.

The driver model calculation unit 66 calculates a driver request power based on the vehicle speed and the accelerator position acquired through the CAN 55, and the calculation result output from the engine brake enlarging determination unit 62. The driver model calculation unit 66 calculates the target drive state based on the calculation result of the engine brake enlarging determination unit 62, and detects the actual drive state through the CAN 55. The driver model calculation unit 66 outputs the information of the output of the engine 5 calculated based on the difference of the target drive state and the actual drive state to the engine ON/OFF determination unit 68 as the driver request power. The driver model calculation unit 66 may output the condition necessary for approaching the drive state based on the accelerator position as the driver request power even if the condition necessary for realizing the target drive state is output as the driver request power.

The engine ON/OFF determination unit 68 determines the drive state of the engine 5 based on the engine early OFF request output from the engine early OFF determination unit 64 and the driver request power. The engine ON/OFF determination unit 68 determines whether to turn ON or OFF the engine 5, that is, whether or not to generate the engine brake in the engine 5 based on the determination result. The engine ON/OFF determination unit 68 outputs the determination result to the drive/brake force control portion 54*c*.

When the OFF operation of the accelerator operation by the driver is actually performed, the drive/brake force control portion 54*c* performs the drive/brake force control, and adjusts so that the actual deceleration of the vehicle 2 becomes the defined accelerator OFF deceleration. Specifically, the drive/brake force control portion 54*c* controls the ON/OFF of the engine 5 and controls the deceleration generated by the engine brake based on the control of the target computation portion 54*b*. Since the vehicle control system 3 is a hybrid system, the drive/brake force control portion 54*c* executes the regeneration engine brake enlargement control of performing the engine brake regeneration by the MG 6 in addition to the normal engine brake, and the like so that the deceleration becomes the defined accelerator OFF deceleration. The engine brake regeneration by the regeneration engine brake enlargement control tends to have a relatively high regeneration efficiency since the influence of heat generation amount at the time of regeneration, and the like is small compared to the brake regeneration corresponding to the ON operation of the brake operation by the driver described above. Therefore, the vehicle control system 3 inductively assists the OFF operation of the accelerator operation by the driver at an appropriate timing by the drive assisting apparatus 1 to ensure a relatively long period for a period of executing the regeneration engine brake enlargement control, whereby higher fuel efficiency enhancing effect can be expected.

Figure 4:
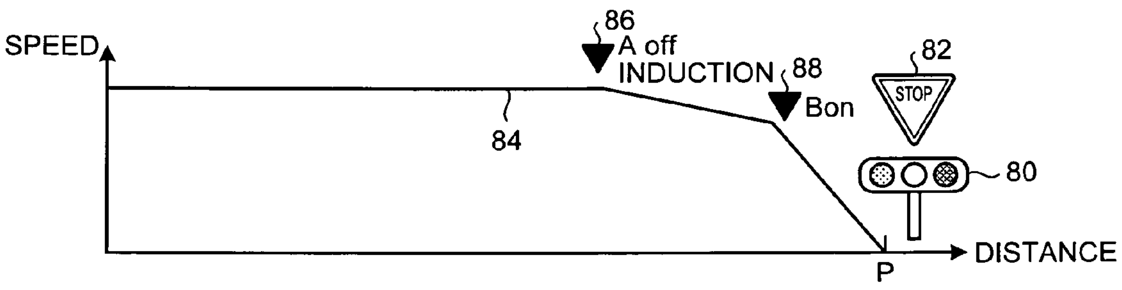
FIG. 4 is a schematic view illustrating a relationship of a remaining distance to a stop position and a vehicle speed.
Figure 5:
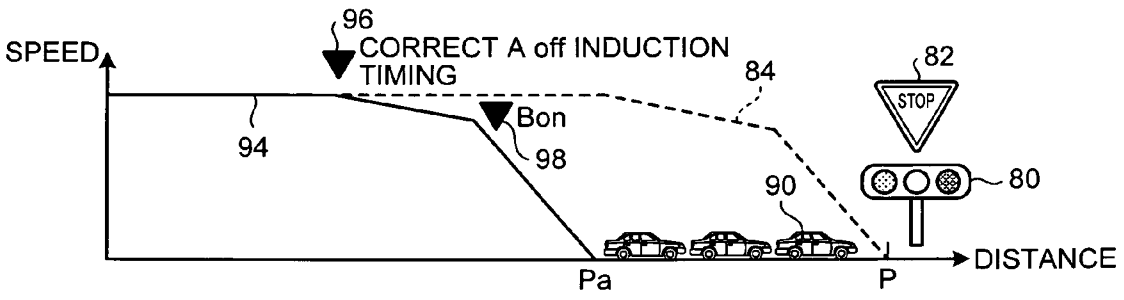
FIG. 5 is a schematic view illustrating the relationship of the remaining distance to the stop position and the vehicle speed.

One example of the process of the drive assisting apparatus 1 of the present embodiment will now be described with reference to FIG. 4 to FIG. 7. FIG. 4 and FIG. 5 are schematic views illustrating the relationship of the remaining distance to the stop position and the vehicle speed. As illustrated in FIG. 4, when detecting the arrival to the point where a traffic light 80, which display is red, and a sign 82 of temporary stop are arranged, the drive assisting apparatus 1 performs the stop assistance with a point P, where a stop line corresponding to the traffic light 80 or the sign 82 is arranged, as a target sopping position. Specifically, the drive assisting apparatus 1 calculates the deceleration pattern that enables stopping at the point P as illustrated with a deceleration pattern 84 of FIG. 4, and determines an accelerator OFF inducing point 86 and a brake ON inducing point 88 for realizing the deceleration pattern 84. The accelerator OFF inducing point 86 is the timing to display an image for inducing accelerator OFF to the driver. The brake ON inducing point 88 is the timing to display an image of inducing the turning ON of the brake, that is, the execution of the brake operation to the driver. The drive assisting apparatus 1 calculates the timing at which various purposes can be realized at high level such as appropriate stopping at the target stopping point, realization of the brake braking at an appropriate deceleration and braking distance, power generation with the engine brake regeneration, as the accelerator OFF inducing point 86. The drive assisting apparatus 1 may also calculate the deceleration pattern 84, the accelerator OFF inducing point 86, and the brake ON inducing point 88 as the target travelling state amount, or may calculate the accelerator OFF inducing point 86 and the brake ON inducing point 88 as the target travelling state amount.

When determining that the current position and the current vehicle speed are the calculated accelerator OFF inducing point 86 and the brake ON inducing point 88, the drive assisting apparatus 1 displays an image corresponding to the relevant operation on the HMI device 4. The accelerator OFF inducing point 86 and the brake ON inducing point 88 of the drive assisting apparatus 1 may assume a predetermined time before the desired operation start time point as the accelerator OFF inducing point 86 and the brake ON inducing point 88 by adding the time related until the operation is executed after the display of the image. Thus, the drive assisting apparatus 1 outputs the drive assisting information based on the target travelling state amount such as the calculated deceleration pattern 84, the accelerator OFF inducing point 86, the brake ON inducing point 88, so that the stopping operation can be assisted such as the vehicle 2 can be decelerated at a pattern complying with the deceleration pattern 84, stop can be appropriately made at the target stopping point, the brake braking can be realized at the appropriate deceleration and the braking distance, and the power can be generated with the engine brake regeneration.

As illustrated in FIG. 4, the drive assisting apparatus 1 assumes the stop line as the target stop position when another vehicle is not present between the own vehicle and the point P where the stop line is arranged, calculates the target travelling state amount for stopping at the target stop position, and outputs the drive assisting information based on the target travelling state amount to stop at the stop line while achieving the suitable deceleration pattern. However, as illustrated in FIG. 5, when another vehicle is stopped with the point P of the stop line as the head, the actual stop position becomes point Pa. In the case illustrated in FIG. 5, even if the drive assisting apparatus 1 performs the stop assistance with the point P of the stop line as the target stop position, the suitable deceleration pattern is not obtained. The driver eventually needs to perform deceleration of high deceleration even if the stop assistance complying with the deceleration pattern 84 is executed, and even if the acceleration is turned OFF according to the assistance.

The drive assisting apparatus 1, on the other hand, calculates the estimated variation distance Y, which is the parameter corresponding to the distance of stopping in a manner shifted with respect to each stop position (reference stop position), shifts the target stop position toward the near side than the actual stop position based on the calculated estimated variation distance Y, and assumes the point Pa as the target stop position. The drive assisting apparatus 1 can calculate the deceleration pattern 94 enabling a suitable stopping at the point Pa, the accelerator OFF inducing point 96, and the brake ON inducing point 98 by assuming the point Pa as the target stop position. As will be described later, the estimated variation distance Y does not calculate the actual stop position at the current time point with the actual measurement value of the sensor, and the like, and thus the target stop position can be a point different from the point Pa, but the target stop position can be brought closer to the point Pa than when maintaining the point P at the target stop position.

Figure 6:
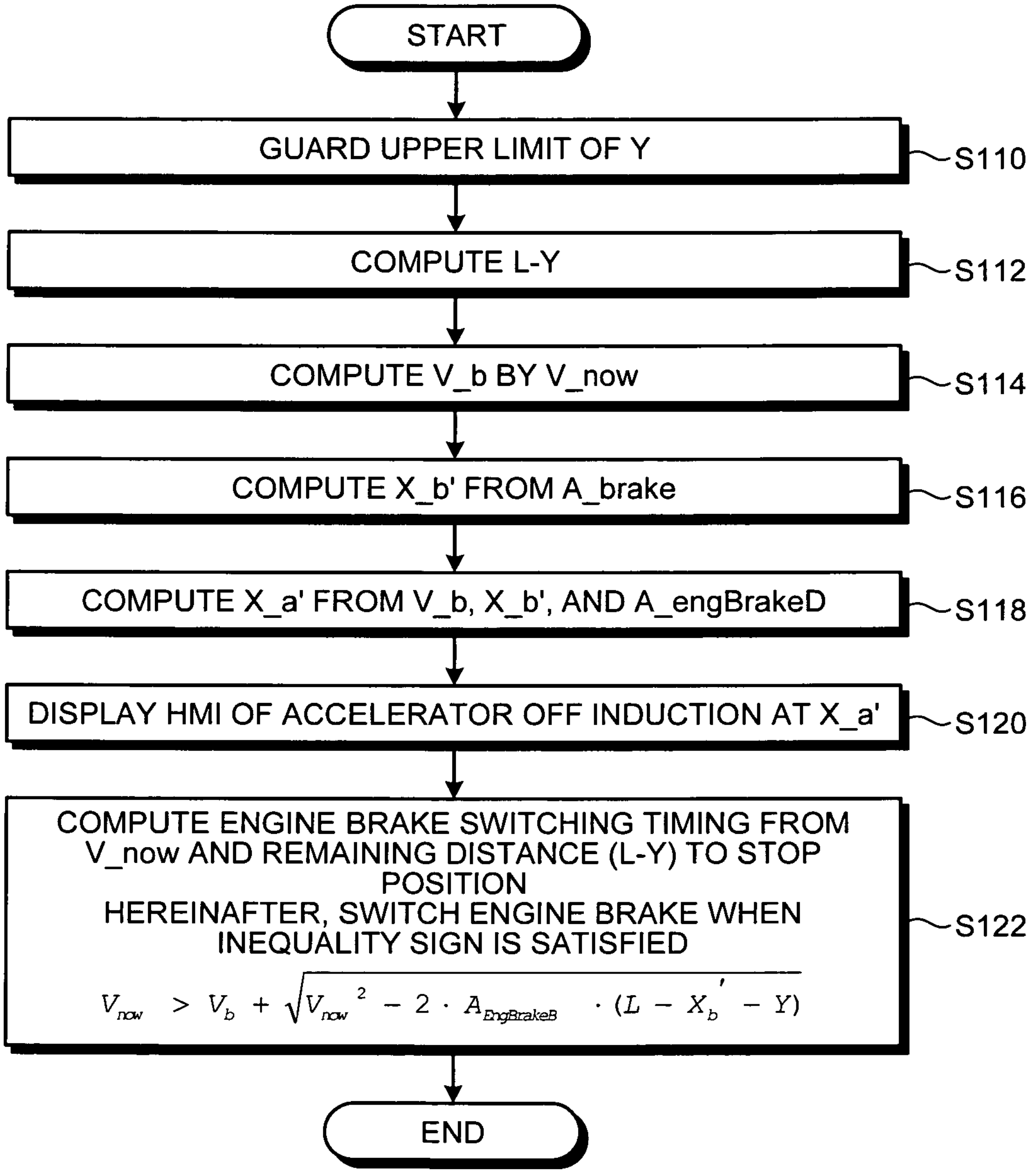
FIG. 6 is a flowchart illustrating one example of the control by the ECU.
Figure 7:
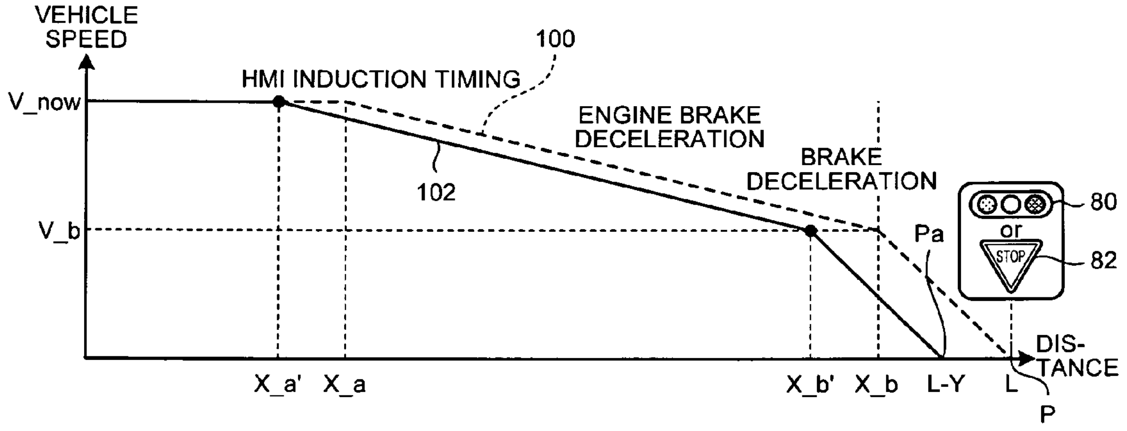
FIG. 7 is a schematic view illustrating one example of a relationship of the remaining distance to the stop position and the vehicle speed, and an assistance mode in the vehicle control system.

The stop assistance using the estimated variation distance will be described below using FIG. 6 and FIG. 7. FIG. 6 is a flowchart illustrating one example of the control by the ECU. FIG. 7 is a schematic view illustrating one example of a relationship of the remaining distance to the stop position and the vehicle speed, and the assistance mode in the vehicle control system. As illustrated in FIG. 6 and FIG. 7, the target computation portion 54*b* first guards the upper limit of the estimated variation distance Y in step S110. That is, after reading out the estimated variation distance Y with respect to the reference stop position, the target computation portion 54*b* determines whether the read out estimated variation distance Y exceeds an upper limit value, and assumes the estimated variation distance Y as the upper limit value when exceeding the upper limit value. Thus, the estimated variation distance Y is made shorter than the distance of $X_b$ from the reference stop position by guarding the upper limit of the estimated variation distance Y. Here, X_b is the position to become the brake ON inducing point when the reference stop position is assumed as the target stop position.

The target computation portion 54*b* calculates L−Y in step S112 after guarding the upper limit value in step S110. The distance L is the distance from the current time point to the point P to become the reference stop position. Thus, the target computation portion 54*b* assumes the position to become L−Y, that is, the position on the near side than the reference stop position by the estimated variation distance Y as the target stopping point.

After calculating L−Y in step S112, the target computation portion 54*b* computes a target brake operation start vehicle speed V_b based on the current vehicle speed (advancing vehicle speed) V_now of the vehicle 2 in step S114. The target computation portion 54*b* multiples a predetermined vehicle speed coefficient to the vehicle speed V_now to calculate the target brake operation start vehicle speed V_b. The vehicle speed coefficient, for example, is set such that the target brake operation start vehicle speed V_b becomes the speed of reaching the stop position at an extent the driver of the vehicle 2 and the driver of the following vehicle do not feel the sudden brake, and are not stressed by the slow vehicle speed of the vehicle 2 when the ON operation of the brake operation is performed.

After setting the target brake operation start vehicle speed V_b in step S114, the target computation portion 54*b* computes a target brake operation start position X_b' serving as a predetermined point based on a target brake deceleration A_brake set in advance in step S116. The target computation portion 54*b* computes the target brake operation start position X_b' based on the target brake operation start vehicle speed V_b and the target brake deceleration A_brake with the target stop position (point of distance L−Y from the current time point) corresponding to the remaining distance arbitrated by the arbitration portion 54*a* as the reference position. In other words, the target computation portion 54*b* back calculates the brake operation start position with which the vehicle 2 can be stopped at the target stop position and assumes the same as the target brake operation start position X_b' when the vehicle 2 travelling at the target brake operation start vehicle speed V_b is decelerated at the target brake deceleration A_brake by the brake operation.

The target brake deceleration A_brake is set as a fixed value in advance according to the deceleration of an extent the driver does not feel the sudden brake and does not feel a sense of discomfort when the driver performs the ON operation of the brake operation, for example. Since the vehicle control system 3 is a hybrid system, the target brake deceleration A_brake is more preferably set to a deceleration in which a slight margin is given to the regeneration upper limit deceleration at which the regeneration can be efficiently performed by the MG 6. Furthermore, the target brake deceleration A_brake is preferably set according to the deceleration the deceleration requested according to the brake operation by the driver can be satisfied with the regenerative braking by the MG 6. In this case, the vehicle control system 3, which is the hybrid system, can stop the vehicle 2 at the stop position by the regenerative braking by the MG 6 without depending on the friction braking by the brake device 8 when the deceleration requested according to the brake operation by the driver is smaller than or equal to the target brake deceleration. In this case, the vehicle control system 3 can expect high fuel efficiency enhancing effect since the motion energy of the vehicle 2 can be efficiently collected as the electric energy by the brake regeneration corresponding to the brake operation by the driver without being consumed as heat energy by the friction braking.

After determining the target brake operation start position X_b' in step S116, the target computation portion 54*b* computes the accelerator OFF inducing position X_a' based on the target brake operation start vehicle speed V_b, the target brake operation start position X_b' and the defined accelerator OFF deceleration A_engBrake set in advance in step S118.

The accelerator OFF deceleration A_engBrake is the deceleration of the vehicle 2 in a state the accelerator operation and the brake operation are turned OFF. For example, the accelerator OFF deceleration A_engBrakeD is set as a fixed value in advance based on the engine brake torque by the rotation resistance of the engine 5, the TM brake torque by the rotation resistance of the transmission 7, the motor regeneration torque corresponding to the regeneration amount in the MG 6 in the hybrid system as in the present embodiment, and the like.

The target computation portion 54*b* computes the accelerator OFF inducing position X_a' based on the accelerator OFF deceleration A_engBrakeD and the target brake operation start vehicle speed V_b with the target brake operation start position X_b' as the reference position. In other words, the target computation portion 54*b* back calculates the OFF position of the accelerator operation with which the vehicle speed of the vehicle 2 can be made the target brake operation start vehicle speed V_b at the target brake operation start position X_b' when the vehicle 2 is decelerated at the accelerator OFF deceleration A_engBrakeD, and assumes the same as the accelerator OFF inducing position X_a'.

After calculating the accelerator OFF inducing position X_a' in step S118, the target computation portion 54*b* starts the output process of the drive assisting information using the HMI device 4. The target computation portion 54*b* outputs the drive assisting information related to the accelerator OFF inducing assistance to the HMI device 4 at the timing the vehicle 2 reaches the accelerator OFF inducing position X_a' at the current vehicle speed in step S120. The HMI device 4 displays the HMI related to the accelerator OFF inducing assistance as the drive assisting information.

When the OFF operation of the accelerator operation by the driver is actually performed, the drive/brake force control portion 54*c* performs the drive/brake force control and adjusts so that the actual deceleration of the vehicle 2 becomes the defined accelerator OFFD range deceleration A_engBrakeB. Meanwhile, the drive/brake force control portion 54*c* executes the regeneration engine brake enlargement control of performing the engine brake regeneration by the MG 6 in addition to the normal engine brake, and the like. The timing to execute the regeneration engine brake enlargement control, and the like can be calculated based on the calculation result of the engine brake enlarging determination unit 62.

The drive/brake force control portion 54*c* of the present embodiment computes the timing to switch the engine brake, that is, the timing to switch the accelerator OFF deceleration based on the current vehicle speed V_now of the vehicle 2 and the remaining distance (L−Y) from the current position to the stop position in step S122. The drive/brake force control portion 54*c*, for example, switches the engine brake at the timing the inequality sign of the following equation (1) is satisfied. That is, the drive/brake force control portion 54*c* switches the accelerator OFF deceleration from the accelerator OFFD range deceleration A_engBrakeD to the accelerator OFFB range deceleration A_engBrakeB. The drive/brake force control portion 54*c* adjusts so that the actual deceleration of the vehicle 2 becomes the accelerator OFFB range deceleration A_eng-BrakeB, terminates the current control period, and proceeds to the next control period.

$$V_{now} > V_b + \sqrt{V_{now}^2 - 2 \cdot A_{EngBrakeB} \cdot (L - X_b' - Y)} \quad (1)$$

In equation (1), [V_now] represents the current vehicle speed of the vehicle 2 at which the OFF operation of the accelerator operation is performed. [V_b] represents the target brake operation start vehicle speed. [A_EngBrakeB] represents the accelerator OFFB range deceleration. [L] represents the remaining distance from the current position to the reference stop position at the timing the OFF operation of the accelerator operation by the driver is actually performed. [Y] represents the estimated variation distance. That is, [L−Y] represents the remaining distance from the current position to the target stop position. [X_b'] represents the target brake operation start position.

The drive assisting apparatus 1 configured as above can inductively assist the timing of the OFF operation of the accelerator operation by the driver so that the vehicle speed becomes the target brake operation start vehicle speed V_b when the vehicle 2 reaches the target brake operation start position X_b' by performing the accelerator OFF induction display at the point X_a'. As a result, the drive assisting apparatus 1 can realize high fuel efficiency enhancing effect since appropriate induction can be performed so that the deceleration requested according to the brake operation becomes the optimum target brake deceleration A_brake when the driver actually performs the brake operation to stop at the target stop position.

As illustrated in FIG. 7, the drive assisting apparatus 1 configured as above calculates the estimated variation distance Y and performs the stop assistance using the deceleration pattern 102 in which the target stop position is moved toward the near side based on the estimated variation distance Y to come to a stop with an appropriate deceleration pattern on the near side than the case of the deceleration pattern 100 in which the stop position is the point P of the distance L from the current position while using the target brake deceleration and the engine brake deceleration same as in the deceleration pattern 100.

The drive assisting apparatus 1 can perform the correction having the reference target position as the reference by calculating the target travelling state amount by adding the estimated variation distance with the reference target position (distance L) point, at where the stop line, and the like exist, as the reference.

The drive assisting apparatus 1 according to the embodiment described above can assist the driving of the vehicle 2 in an easily understandable manner at an appropriate timing with respect to the driver, and thus can appropriately perform the driving assistance, and for example, appropriate assist the eco-driving (eco-drive) by the driver thus suppressing the consumption of fuel and enhancing the fuel efficiency.

In the description made above, the drive assisting apparatus 1 has been described assuming the vehicle 2 is the hybrid vehicle, but this is not the sole case, and can appropriate perform the drive assistance for the conveyor vehicle or the EV vehicle.

Figure 8:
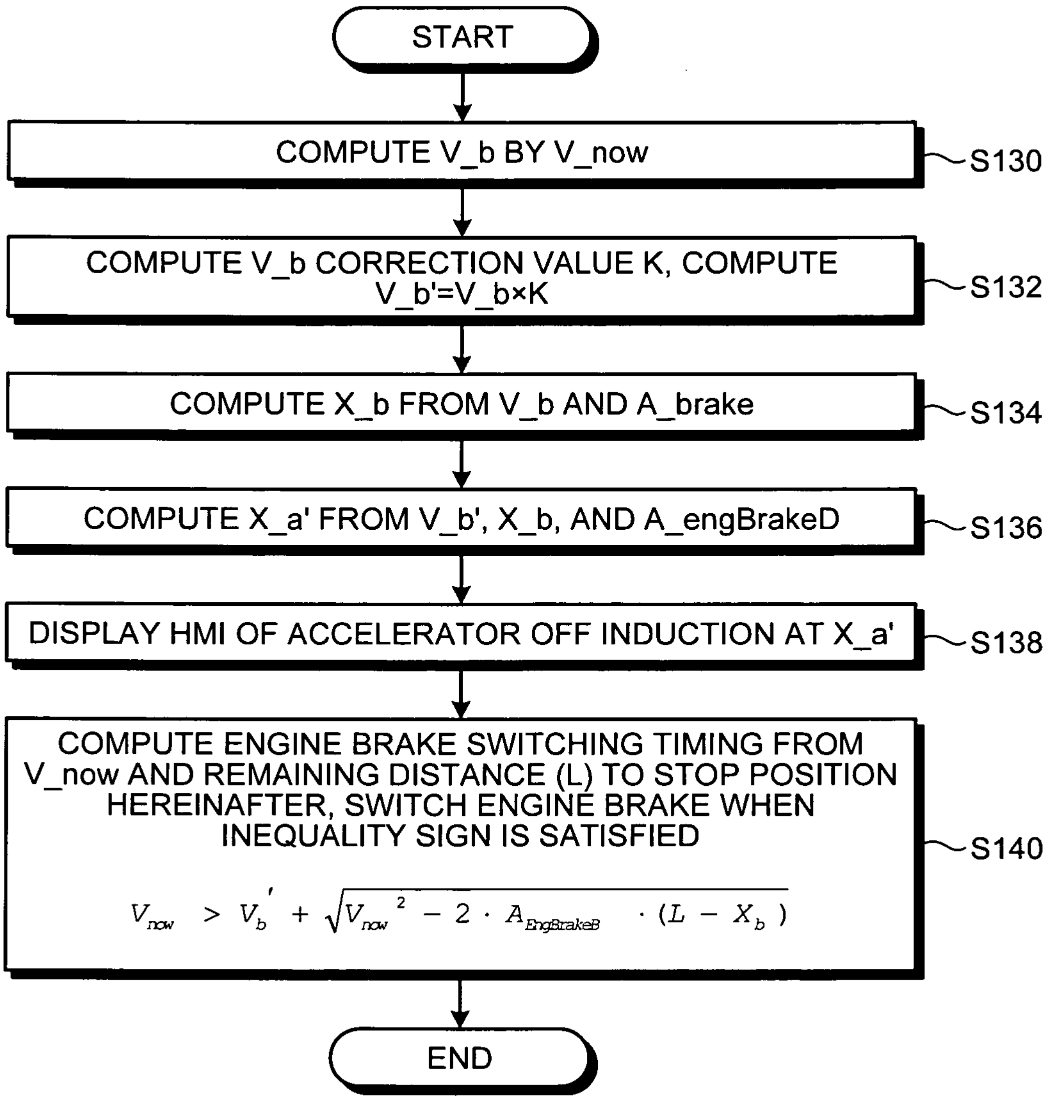
FIG. 8 is a flowchart illustrating another example of the control by the ECU.
Figure 9:
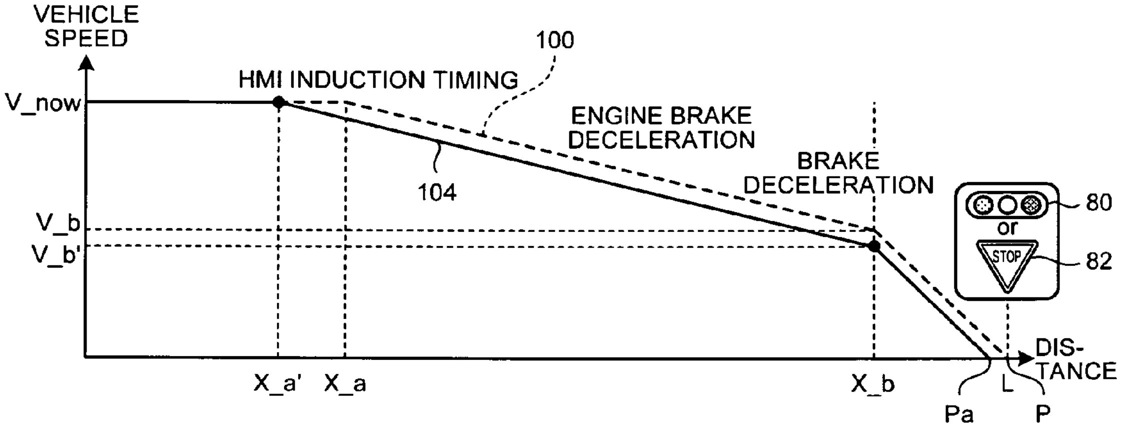
FIG. 9 is a schematic view illustrating the relationship of the remaining distance to the stop position and the vehicle speed, and the assistance mode in the vehicle control system.
Figure 10:
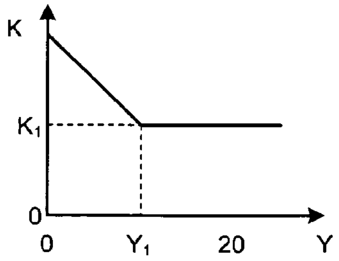
FIG. 10 is a graph illustrating one example of a relationship of a distance Y and a coefficient K.

The method for changing the deceleration pattern using the estimated variation distance Y is not limited to the example of FIG. 6 and FIG. 7. Another example of the stop assistance using the estimated variation distance will be described below using FIG. 8 to FIG. 10. FIG. 8 is a flowchart illustrating another example of the control by the ECU. FIG. 9 is a schematic view illustrating one example of the relationship of the remaining distance to the stop position and the vehicle speed and the assistance mode in the vehicle control system. FIG. 10 is a graph illustrating one example of a relationship of the distance Y and the coefficient K.

As illustrated in FIG. 8 and FIG. 9, the target computation portion 54*b* first computes the target brake operation start vehicle speed V_b based on the current vehicle speed (advancing vehicle speed) V_now of the vehicle 2 in step S130. The target computation portion 54*b* multiples a predetermined vehicle speed coefficient to the vehicle speed V_now to calculate the target brake operation start vehicle speed V_b. The target brake operation start vehicle speed V_b can be calculated with a method similar to the embodiment described above.

After setting the target brake operation start vehicle speed V_b in step S130, the target computation portion 54*b* then computes the V_b correction value K by the estimated variation distance Y and calculates the target brake operation start vehicle speed correction value V_b'=V_b×K as step S132. As illustrated in FIG. 10, the V_b correction value K is the coefficient set in advance with respect to the estimated variation distance Y. The relationship between the V_b correction value K and the estimated variation distance Y is such that the V_b correction value K and the estimated variation distance Y proportionally increase until the estimated variation distance Y reaches a predetermined value Y1, and the V_b correction value K becomes a constant value K1 when the estimated variation distance Y becomes greater than a predetermined value Y1. Here, K is a value smaller than one, and the target brake operation start vehicle speed correction value V_b' is a value of lower speed than the target brake operation start vehicle speed V_b.

After calculating the target brake operation start vehicle speed correction value V_b' in step S132, the target computation portion 54*b* computes the target brake operation start position X_b for a predetermined point based on the target brake operation start vehicle speed V_b and the target brake deceleration A_brake set in advance in step S134. The target computation portion 54*b* computes the target brake operation start position X_b based on the target brake operation start vehicle speed V_b and the target brake deceleration A_brake with the reference stop position (point of distance L from the current time point) as the reference position. In other words, when the vehicle 2 travelling at the target brake operation start vehicle speed V_b decelerates at the target brake deceleration A_brake by the brake operation, the target computation portion 54*b* back calculates the brake operation start position at which the vehicle 2 can be stopped at the reference stop position and assumes the same as the target brake operation start position X_b. The target brake operation start position X_b becomes the same as the target brake operation start position calculated when the reference stop position is assumed as the target stop position, that is, the deceleration pattern 100 of FIG. 9. The target brake deceleration A_brake is a value similar to the embodiment described above.

After determining the target brake operation start position X_b in step S134, the target computation portion 54*b* computes the accelerator OFF inducing position X_a' based on the target brake operation start vehicle speed correction value V_b', the target brake operation start position X_b, and the defined accelerator OFF deceleration A_engBrakeD set in advance in step S136. The accelerator OFF deceleration A_engBrakeD is a value similar to the embodiment described above.

The target computation portion 54*b* computes the accelerator OFF inducing position X_a' based on the accelerator OFF deceleration A_engBrakeD and the target brake operation start vehicle speed correction value V_b' with the target brake operation start position X_b as the reference position. In other words, when the vehicle 2 is decelerated at the accelerator OFF deceleration A_engBrakeD, the target computation portion 54*b* back calculates the OFF position of the accelerator operation with which the vehicle speed of the vehicle 2 can be made to the target brake operation start vehicle speed correction value V_b' at the target brake operation start position X_b and assumes the same as the accelerator OFF inducing position X_a'.

After calculating the accelerator OFF inducing position X_a' in step S136, the target computation portion 54*b* starts the output process of the drive assisting information using the HMI device 4. The target computation portion 54*b* outputs the drive assisting information associated with the accelerator OFF inducing assistance to the HMI device 4 at the timing the vehicle 2 reaches the accelerator OFF inducing position X_a' at the current vehicle speed in step S138. The HMI device 4 displays the HMI related to the accelerator OFF inducing assistance as the drive assisting information. When the OFF operation of the accelerator operation by the driver is actually performed, similar to the embodiment described above, the drive/brake force control portion 54*c* performs the drive/brake force control and adjusts so that the actual deceleration of the vehicle 2 becomes the defined accelerator OFFD range deceleration A_engBrakeD.

The drive/brake force control portion 54*c* of the present embodiment then computes the timing to switch the engine brake, that is, the timing to switch the accelerator OFF deceleration based on the current vehicle speed V_now of the vehicle 2 and the remaining distance L from the current position to the reference stop position in step S140. The drive/brake force control portion 54*c*, for example, switches the engine brake at a timing the inequality sign of the following equation (2) is satisfied. That is, the drive/brake force control portion 54*c* switches the accelerator OFF deceleration from the accelerator OFFD range deceleration A_engBrakeD to the accelerator OFFB range deceleration A_EngBrakeB. The drive/brake force control portion 54*c* then adjusts so that the actual deceleration of the vehicle 2 becomes the accelerator OFFB range deceleration A_EngBrakeB, terminates the current control period, and proceeds to the next control period.

$$V_{now} > V_b' + \sqrt{V_{now}^2 - 2 \cdot A_{EngBrakeB} \cdot (L - X_b)} \qquad (2)$$

In equation (2), [V_now] represents the current vehicle speed of the vehicle 2 at which the driver performed the OFF operation of the accelerator operation. [V_b'] represents the target brake operation start vehicle speed correction value. [A_EngBrakeB] represents the accelerator OFFB range deceleration. [L] represents the remaining distance from the current position to the reference stop position at the timing the OFF operation of the accelerator operation by the driver is actually performed. [X_b] represents the target brake operation start position.

The drive assisting apparatus 1 configured as above can inductively assist the timing of the OFF operation of the accelerator operation by the driver so that the vehicle speed becomes the target brake operation start vehicle speed correction value V_b' when the vehicle 2 reaches the target brake operation start position X_b by performing the accelerator OFF induction display at point X_a'. As a result, the drive assisting apparatus 1 can realize high fuel efficiency enhancing effect since appropriate induction can be performed so that the deceleration requested according to the brake operation becomes the optimum target brake deceleration A_brake when the driver actually performs the brake operation to stop at the stop position.

As illustrated in FIG. 8 and FIG. 9, the drive assisting apparatus 1 configured as above calculates the estimated variation distance Y, and corrects the target brake operation start vehicle speed V_b to the target brake operation start vehicle speed correction value V_b' according to the estimated variation distance Y to further lower the vehicle speed of when reaching the target brake operation start position X_b. The driver thus can stop the vehicle on the near side than the reference stop position by starting the deceleration in the optimum target brake deceleration A_brake at the target brake operation start position X_b. That is, as illustrated in the deceleration pattern 104, the vehicle can be stopped with the appropriate deceleration pattern on the near side than the case of the deceleration pattern 100 by realizing the target brake operation start vehicle speed correction value V_b'.

In the embodiment described above, the target brake operation start vehicle speed V_b is corrected based on the estimated variation distance Y to calculate the target brake operation start vehicle speed correction value V_b', but this is not the sole case. The target computation portion 54*b* calculates the target brake operation start position X_b for a predetermined point based on the target brake operation start vehicle speed V_b and the target brake deceleration A_brake set in advance with the reference stop position as the reference position. The target computation portion 54*b* may further assume the speed of decelerating at the target brake deceleration A_brake from the target brake operation start position X_b and stopping at the point of distance L−Y from the current time point as the target brake operation start vehicle speed correction value based on the target brake deceleration A_brake and the target brake operation start position X_b with the target stop position (point of distance L−Y from the current time point) corresponding to the remaining distance as the reference.

Figure 11:
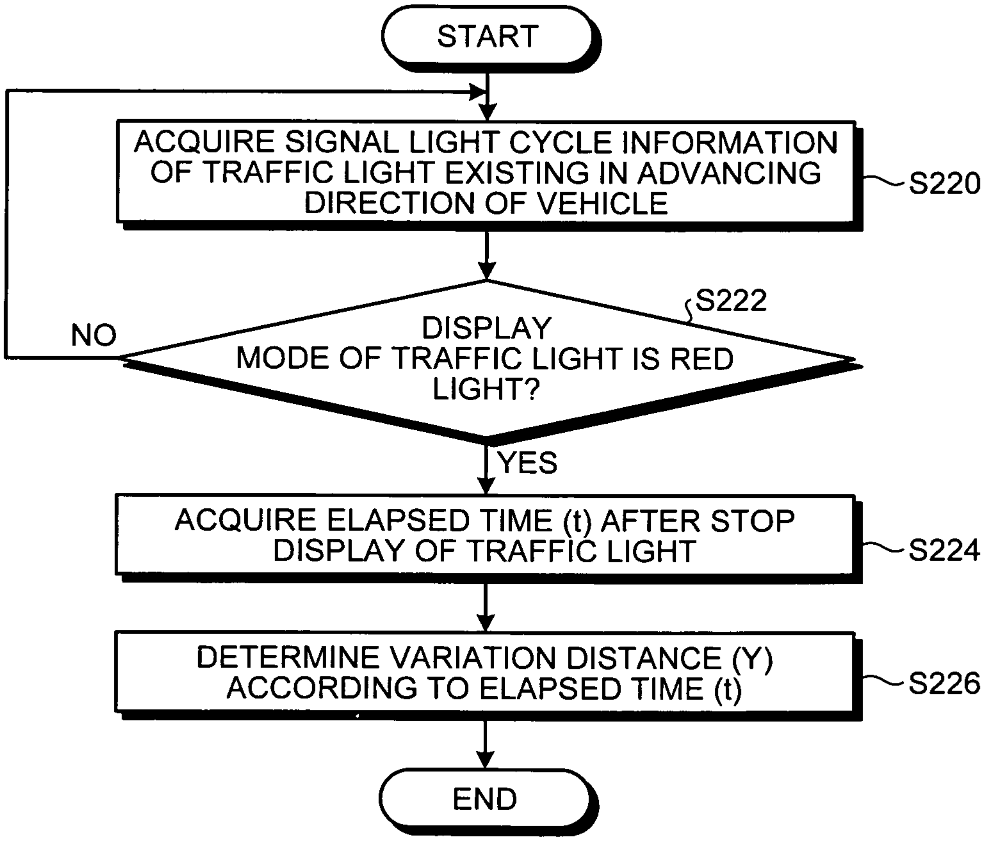
FIG. 11 is a flowchart illustrating one example of the control by the ECU.
Figure 12:
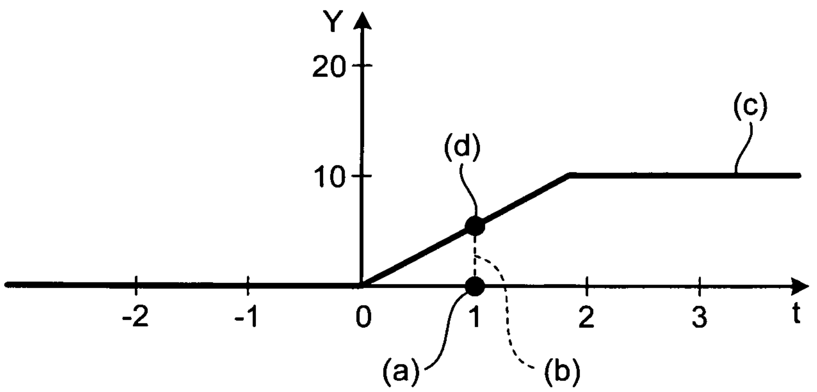
FIG. 12 is a graph illustrating one example of a relationship of an elapsed time t and an estimated variation distance Y.
Figure 13:
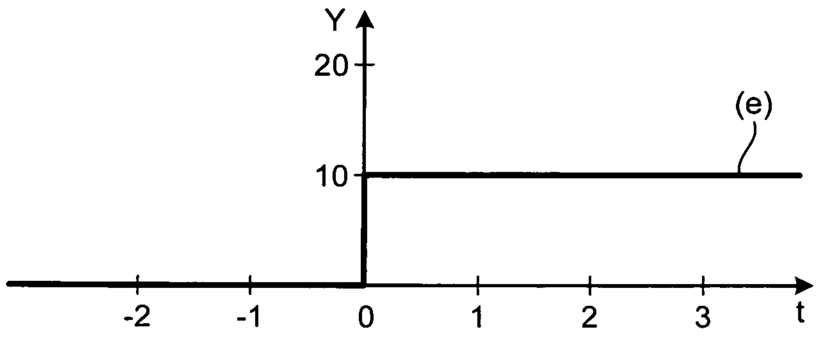
FIG. 13 is a graph illustrating another example of the relationship of the elapsed time t and the estimated variation distance Y.
Figure 14:
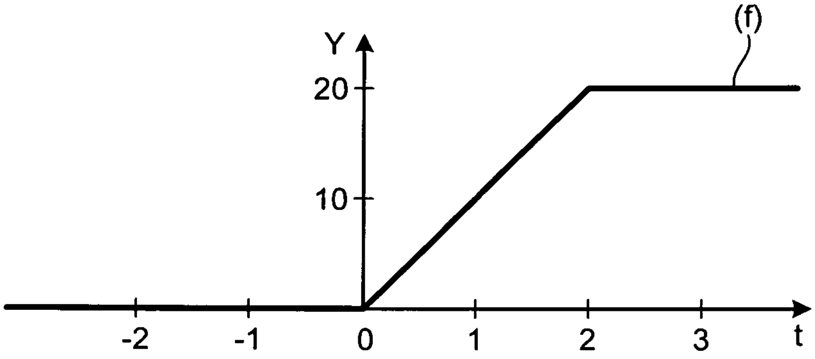
FIG. 14 is a graph illustrating one example of the relationship of the elapsed time t and the estimated variation distance Y when a maximum value and an increasing rate of the estimated variation distance Y are adjusted.
Figure 15:
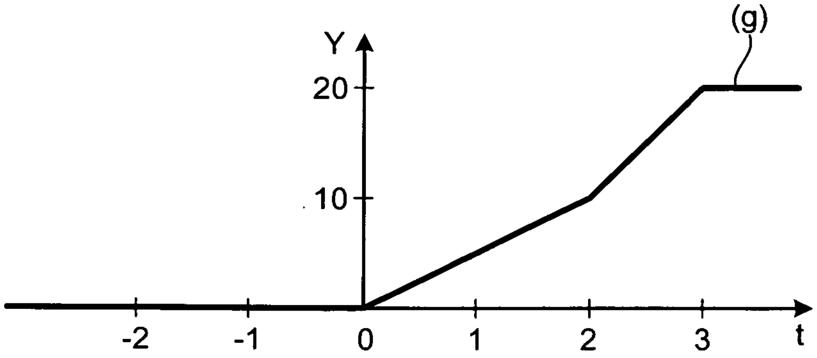
FIG. 15 is a graph illustrating one example of the relationship of the elapsed time t and the estimated variation distance Y when an increasing rule of the estimated variation distance Y is adjusted.

The method for calculating the estimated variation distance Y will now be described using FIG. 11 to FIG. 15. FIG. 11 is a flowchart illustrating one example of the control by the ECU, FIG. 12 is a graph illustrating one example of a relationship of an elapsed time t and the estimated variation distance Y, FIG. 13 is a graph illustrating another example of the relationship of the elapsed time t and the estimated variation distance Y, FIG. 14 is a graph illustrating one example of the relationship of the elapsed time t and the estimated variation distance Y when a maximum value and an increasing rate of the estimated variation distance Y are adjusted, and FIG. 15 is a graph illustrating one example of a relationship of the elapsed time t and the estimated variation distance Y when an increasing rule of the estimated variation distance Y is adjusted. The processes illustrated in FIG. 11 is to be performed by each unit of the ECU 50, specifically, the first information computation unit 51, the second information computation unit 52, and the third information computation unit 53. The ECU 50 may separately include a computation unit that determines the estimated variation distance Y. The ECU 50 repeatedly executes the processes illustrated in FIG. 11 during travelling.

As illustrated in FIG. 11, the target computation portion 54*b* first acquires the signal light cycle information by receiving the signal light information including the signal light cycle information of the traffic light that exists in the advancing direction of the vehicle 2 acquired by the signal light information acquiring portion 52*b* (step S220).

The target computation portion 54*b* then determines whether or not the display mode of the traffic light is a red light based on the signal light cycle information acquired in step S220 (step S222). The target computation portion 54*b* also determines that the display mode is a red light when the display mode of the traffic light is a yellow light.

When determined that the display mode of the traffic light is the red light in step S222 (step S222: Yes), the target computation portion 54*b* acquires an elapsed time (t) elapsed from when the traffic light is switched to the stop display of the red light (step S224). Specifically, the target computation portion 54*b* acquires a lighting continuing time of the red light included in the signal light cycle information acquired in step S220 as the elapsed time. When determined that the display mode of the traffic light is not the red light, that is, is the green light in step S222 (step S222: No), the target computation portion 54*b* proceeds to the process of step S220.

The target computation portion 54*b* determines the estimated variation distance (Y) (step S226) in accordance with the elapsed time (t) acquired in step S224. Specifically, the target computation portion 54*b* references the graph illustrating the relationship of the elapsed time (t) set in advance and the estimated variation distance (Y) as illustrated in FIG. 12 and plots on the corresponding position (position where elapsed time illustrated in (a) of FIG. 12 is one minute) on a horizontal axis indicating the elapsed time (t) (e.g., one minute) acquired in step S224. The target computation portion 54*b* obtains an intersection of an extended line (line illustrated in (b) of FIG. 12) extending in the vertical axis direction from the plotted corresponding position and a line ((c) of FIG. 12) indicating the value of the estimated variation distance that changes in accordance with the elapsed time. The target computation portion 54*b* then determines the value of the estimated variation distance at the intersection (point illustrated in (d) of FIG. 12) as the estimated variation distance for stopping the vehicle 2 by the stopping display of the traffic light. Thereafter, the process is terminated. The graph illustrated in FIG. 12 is created based on the learning information, and the like obtained in the actual travelling of the vehicle 2 for every traffic light or for every time slot, and stored in advance in the database 15.

In FIG. 12, the left side from the vertical axis indicates that the value of the estimated variation distance (Y) of when the traffic light is a green light is "zero". That is, in FIG. 12, when the display mode of the traffic light is the green light, assumption can be made that the preceding vehicle stopped at the point of the relevant traffic light does not exist, and thus the value of the estimated variation distance is assumed as "zero". Furthermore, in FIG. 12, the right side from the vertical axis indicates that when the traffic light is the red light, the value of the estimated variation distance becomes greater in accordance with the elapsed time and becomes a constant value (value of 10 m in FIG. 12) when exceeding a predetermined time. That is, in FIG. 12, when the display mode of the traffic light is the red light, the number of preceding vehicles stopping at the point of the relevant traffic light is assumed to increase in accordance with the elapsed time, and thus the value of the estimated variation distance is made greater in accordance with the elapsed time. Thus, the target computation portion 54*b* can adjust the value of the remaining distance indicated by "L−Y" to a large value that adds the increase in the number of preceding vehicles when computing "L−Y" in the process of step S112 of FIG. 6. The estimated variation distance (Y) determined by the target computation portion 54*b* is also used when computing the "V_b'" in the process of step S132 of FIG. 8.

As illustrated in FIG. 11 and FIG. 12, the target computation portion 54*b* determines the estimated variation distance (Y) and performs the control illustrated in FIG. 6 or FIG. 8 based on the estimated variation distance (Y) to obtain the following effects. For example, the timing to start the stop assistance is changed based on the elapsed time elapsed from when the traffic light is switched to the stop display, and hence the number of preceding vehicles stopped by the traffic light ahead of the vehicle 2 can be estimated from the elapsed time. Thus, the stop assistance can be started at an appropriate timing adding that the future stop position shifts to the point on the near side in the advancing direction than the point of the traffic light.

In step S226 of FIG. 11, an example in which the target computation portion 54*b* determines the estimated variation distance (Y) with reference to the graph illustrated in FIG. 12 has been described, but the graph illustrated in FIG. 13 may be referenced instead of the graph of FIG. 12. In FIG. 13, the value of the estimated variation distance illustrated on the right side from the vertical axis is fixed at a predetermined constant value (value of 10 m in FIG. 13). In this case, the target computation portion 54*b* determines a predetermined value (value of 10 m corresponding to the line illustrated in (e) of FIG. 13) set in advance as the estimated variation distance when the display mode of the traffic light is the stop display irrespective of the change in the value of the elapsed time (t).

In step S226 of FIG. 11, the target computation portion 54*b* may adjust the value of the estimated variation distance (Y) with respect to the elapsed time (t) in the graph to be referenced based on past stop position information indicating the past stop position where the vehicle 2 stopped in the past at the point of the traffic light, and then determine the estimated variation distance (Y) with reference to the graph after the adjustment. The past stop position information is created based on the learning information, and the like obtained in the actual travelling of the vehicle 2 for every traffic light or for every time slot in advance, and stored in advance in the database 15. The past stop position information is information indicating the position of an average value of the past stop position or the past stop position in which most distant from the traffic light, for example. For example, the position of the average value of the plurality of accumulated past stop positions can be assumed as the position having a high possibility of the vehicle 2 stopping at the target traffic light. The target computation portion 54*b* may further obtain a standard deviation of the past stop position, and evaluate the reliability of the position of the average value from the standard deviation. The past stop position (e.g., position of 20 m on the near side from the target traffic light) most distant from the target traffic light can be assumed as indicating the maximum value of the estimated variation distance at the target traffic light. In this case, for example, the target computation portion 54*b* determines the maximum value of the estimated variation distance with respect to the elapsed time as the value of 20 m based on the past stop position information, as illustrated in FIG. 14. Furthermore, the target computation portion 54*b* determines the increasing rate of the estimated variation distance so that the elapsed time reaches the maximum value of the estimated variation distance with respect to the elapsed time in two minutes, as illustrated with a line in (f) of FIG. 14, based on the past stop position information. Thereafter, the target computation portion 54*b* references the graph illustrated in FIG. 14 after the adjustment to determine the estimated variation distance. As a result, the presence or absence of the preceding vehicle can be accurately estimated based on the distribution of the past stop positions of the vehicle 2 in addition to the elapsed time, whereby the stop assistance can be started at a more appropriate timing.

In step S226 of FIG. 11, the target computation portion 54*b* may adjust the value of the estimated variation distance (Y) based on the correlativity of the elapsed time (t) and the past stop position information, and then determine the estimated variation distance (Y) with reference to the graph after the adjustment. The correlativity of the elapsed time (t) and the past stop position information is created based on the learning information, and the like obtained in the actual travelling of the vehicle 2 for every traffic light or for every time slot in advance, and stored in advance in the database 15. The correlativity is the changing pattern of the past stop position with respect to the elapsed time. For example, when another side walk is connected on the near side of the target traffic light existing in the advancing direction of the travelling path on which the vehicle 2 is travelling, another vehicle might advance from the side walk and stop at the red light of the target traffic light. In this case, the target computation portion 54*b* may determine the increasing rule of the estimated variation distance with respect to the elapsed time based on the change in the past stop position with respect to the elapsed time indicated by the past stop position information accumulated for every elapsed time in advance. For example, when the traffic light of the side walk is changed to the green light when the elapsed time of the target traffic light is two minutes, the value of the estimated variation distance with respect to the target traffic light can be assumed that the changing rate increases at the time point the elapsed time is two minutes. In this case, the target computation portion 54*b* determines the increasing rule in which the increasing rate of the estimated variation distance is changed around when the elapsed time is two minutes so that the value of the estimated variation distance reaches the value of 10 m when the elapsed time is two minutes and reaches the maximum value of 20 m when the elapsed time is three minutes, as illustrated with a line in (g) of FIG. 15. As a result, the stop assistance can be started at a more appropriate timing by adding the correlativity of the elapsed time and the actual stop position that differs according to various travelling environments. The target computation portion 54*b* may adjust the estimated variation distance with respect to the elapsed time or may acquire that adjusted in advance and stored in the database 15 in step S226.

In the embodiment described above, an example in which the target computation portion 54*b* determines the estimated variation distance (Y) in accordance with the elapsed time (t) and creates the target vehicle travelling state in which the timing to start the stop assistance is changed based on the determined estimated variation distance has been described, but this is not the sole case. The target computation portion 54*b* may change the timing to start the stop assistance by directly determining the target stop position in accordance with the elapsed time without taking the estimated variation distance into consideration, and creating the target vehicle travelling state based on the determined target stop position. For example, the target computation portion 54*b* may determine the past stop position indicated by the past stop position information accumulated for every elapsed time in advance as the stopping target position corresponding to the elapsed time.

The drive assisting apparatus according to the embodiment of the present invention described above is not limited to the embodiment described above, and various changes can be made within a scope described in the Claims. The drive assisting apparatus according to the present embodiment may be configured by appropriately combining the configuring elements of each embodiment described above.

In the description made above, the assistance controller and the deceleration controller have been described as being simultaneously used by the ECU 50, but this is not the sole case. For example, the assistance controller and the deceleration controller may be configured separate from the ECU 50, and may exchange information such as detection signals, drive signals, control commands with each other.

In the description made above, the target travelling state amount has been described as the target brake operation start vehicle speed serving as the recommended vehicle speed at which the brake operation (brake request operation) by the driver is recommended, but this is not the sole case. The target travelling state amount merely needs to be a target state amount indicating the travelling state of the vehicle, and for example, may be a target vehicle acceleration/deceleration, target speed-change ratio (target speed-change level), target operation angle, and the like.

In the description made above, the recommended driving operation which the drive assisting apparatus inductively assists with respect to the driver, that is, the driving assisted by the drive assisting apparatus has been described as the OFF operation of the accelerator operation (release operation of the acceleration request operation) by the driver, but this is not the sole case. The recommended driving operation which the drive assisting apparatus inductively assists with respect to the driver may be, for example, acceleration request operation, brake request operation, release operation of the brake request operation, speed-change operation, steering operation, and the like.

In the description made above, the drive assisting apparatus has been described to output the visual information as the drive assisting information, but this is not the sole case. For example, the drive assisting apparatus may output the audio information, touch information, and the like for the drive assisting information, or may be configured to appropriately change the mode of the audio information and the touch information.

The drive assisting apparatus 1 of the present embodiment uses the millimeter wave sensor 16 for the preceding vehicle detection means for detecting the preceding vehicle (front vehicle), but is not limited thereto. A camera that acquires the image of the front side of the vehicle 2 may be used for the preceding vehicle detection means. The drive assisting apparatus 1 may analyze the image acquired by the camera, and detect the preceding vehicle ahead in the advancing direction.

REFERENCE SIGNS LIST

1 DRIVE ASSISTING APPARATUS
2 VEHICLE
3 VEHICLE CONTROL SYSTEM
4 HMI DEVICE (ASSISTING DEVICE)
5 ENGINE (INTERNAL COMBUSTION)
6 MOTOR GENERATOR, MG (ELECTRIC MOTOR)
13 GPS DEVICE
14 WIRELESS COMMUNICATION DEVICE
15 DATABASE
50 ECU (ASSISTANCE CONTROLLER, DECELERATION CONTROLLER)
51 FIRST INFORMATION COMPUTATION UNIT
52 SECOND INFORMATION COMPUTATION UNIT
53 THIRD INFORMATION COMPUTATION UNIT

54 VEHICLE CONTROL UNIT

55 CAN

60 ACCELERATOR OFF INDUCING HMI DETERMINATION UNIT

62 ENGINE BRAKE ENLARGING DETERMINATION UNIT

64 ENGINE EARLY OFF DETERMINATION UNIT

66 DRIVER MODEL CALCULATION UNIT

68 ENGINE ON/OFF DETERMINATION UNIT

The invention claimed is:

1. A drive assisting apparatus configured to assist driving of a vehicle, the drive assisting apparatus comprising:

an assistance controller configured to determine an estimated variation including a distance between a reference stop position at a traffic light and a target stop position for the vehicle in accordance with an elapsed time elapsed from a time the traffic light is switched to a stop display, the traffic light existing in an advanced direction of the vehicle, and calculate a target travelling state amount including a target brake operation start vehicle speed based on the estimated variation to change a timing to start stop assistance, the target brake operation start vehicle speed being a recommended vehicle speed at a start of a brake operation; and at least one of a display device and a speaker configured to output drive assisting information for assisting the driving of the vehicle based on the target travelling state amount calculated by the assistance controller.

2. The drive assisting apparatus according to claim 1, wherein the assistance controller:

determines the target stop position based on a difference between the estimated variation and the reference stop position at the traffic light, and calculates the target travelling state amount based on the target stop position to change the timing to start the stop assistance.

3. The drive assisting apparatus according to claim 2, wherein the assistance controller:

calculates a correction value based on the estimated variation, and calculates the target travelling state amount based on the correction value to change the timing to start the stop assistance.

4. The drive assisting apparatus according to claim 3, wherein the estimated variation becomes greater with an increase in the elapsed time.

5. The drive assisting apparatus according to claim 3, wherein the assistance controller adjusts a value of the estimated variation with respect to the elapsed time based on past stop position information indicating a past stop position in which the vehicle stopped at the traffic light in the past.

6. The drive assisting apparatus according to claim 2, wherein the estimated variation becomes greater with an increase in the elapsed time.

7. The drive assisting apparatus according to claim 6, wherein the assistance controller adjusts a value of the estimated variation with respect to the elapsed time based on past stop position information indicating a past stop position in which the vehicle stopped at the traffic light in the past.

8. The drive assisting apparatus according to claim 2, wherein the assistance controller adjusts a value of the estimated variation with respect to the elapsed time based on past stop position information indicating a past stop position in which the vehicle stopped at the traffic light in the past.

9. The drive assisting apparatus according to claim 8, wherein the assistance controller determines a maximum value of the estimated variation with respect to the elapsed time based on the past stop position information.

10. The drive assisting apparatus according to claim 9, wherein the assistance controller:

adjusts the value of the estimated variation based on a correlativity between the elapsed time and the past stop position information, and learns the correlativity for the traffic light or for a time slot.

11. The drive assisting apparatus according to claim 9, wherein the past stop position information is information indicating a position of an average value of the past stop positions or the past stop position which is most distant from the traffic light.

12. The drive assisting apparatus according to claim 8, wherein the assistance controller determines an increasing rate of the estimated variation with respect to the elapsed time based on the past stop position information.

13. The drive assisting apparatus according to claim 12, wherein the assistance controller:

adjusts the value of the estimated variation based on a correlativity between the elapsed time and the past stop position information, and learns the correlativity for the traffic light or for a time slot.

14. The drive assisting apparatus according to claim 8, wherein the assistance controller:

adjusts the value of the estimated variation based on a correlativity between the elapsed time and the past stop position information, and learns the correlativity for the traffic light or for a time slot.

15. The drive assisting apparatus according to claim 14, wherein the past stop position information includes a changing pattern of the past stop position according to the elapsed time, and the assistance controller determines an increment rule of the estimated variation with respect to the elapsed time based the changing pattern of the past stop position.

16. The drive assisting apparatus according to claim 14, wherein the past stop position information is information indicating a position of an average value of the past stop positions or the past stop position which is most distant from the traffic light.

17. The drive assisting apparatus according to claim 2, wherein the assistance controller determines a constant value, which is set in advance at the time a display mode of the traffic light is the stop display, as the estimated variation.

18. The drive assisting apparatus according to claim 1, wherein the at least one of the display device and the speaker performs assistance of urging recommended driving operation by outputting the drive assisting information.

19. The drive assisting apparatus according to claim 18, wherein the drive assisting information includes information instructing release of an acceleration request operation and a brake request operation.

20. The drive assisting apparatus according to claim 18, wherein the drive assisting information includes information instructing start of a brake request operation.

* * * * *